(12) United States Patent
Ikeda

(10) Patent No.: US 11,027,339 B2
(45) Date of Patent: Jun. 8, 2021

(54) CUTTING INSERT, CUTTING TOOL, AND METHOD OF MANUFACTURING MACHINED PRODUCT

(71) Applicant: KYOCERA Corporation, Kyoto (JP)

(72) Inventor: Yoshihito Ikeda, Ritto (JP)

(73) Assignee: KYOCERA CORPORATION, Kyoyo (JP)

( * ) Notice: Subject to any disclaimer, the term of this patent is extended or adjusted under 35 U.S.C. 154(b) by 0 days.

(21) Appl. No.: 16/483,410

(22) PCT Filed: Feb. 27, 2018

(86) PCT No.: PCT/JP2018/007199
§ 371 (c)(1),
(2) Date: Aug. 2, 2019

(87) PCT Pub. No.: WO2018/155705
PCT Pub. Date: Aug. 30, 2018

(65) Prior Publication Data
US 2020/0009664 A1  Jan. 9, 2020

(30) Foreign Application Priority Data

Feb. 27, 2017 (JP) .............................. JP2017-034378

(51) Int. Cl.
*B23B 27/22* (2006.01)
*B23B 27/20* (2006.01)
*B23B 27/14* (2006.01)

(52) U.S. Cl.
CPC ............. *B23B 27/20* (2013.01); *B23B 27/22* (2013.01); *B23B 27/143* (2013.01); *B23B 2200/081* (2013.01); *B23B 2200/201* (2013.01)

(58) Field of Classification Search
CPC ...... B23C 2210/168; B23B 2200/0447; B23B 2200/201; B23B 2200/321; B23B 27/143;
(Continued)

(56) References Cited

U.S. PATENT DOCUMENTS 4,859,122 A * 8/1989 Patterson .............. B23B 27/143
407/114
4,988,242 A * 1/1991 Pettersson ............. B23B 27/143
407/114

(Continued)

FOREIGN PATENT DOCUMENTS

EP          1967304 A2 *  9/2008  .......... B23B 27/143
JP       01171705 A  *  7/1989
(Continued)

*Primary Examiner* — Sara Addisu
(74) *Attorney, Agent, or Firm* — Volpe Koenig

(57) ABSTRACT

A cutting insert based on a non-limiting aspect has a first member and a second member joined to the first member. The second member has an upper surface and a side surface adjacent to the upper surface. The upper surface includes a first side, a second side and a corner. The upper surface has a first convex portion extending toward the corner, and a second convex portion extending from the first convex portion toward the first side. The second convex portion has a first end portion and a second end portion located closer to the corner than the first end portion. A first length from the first end to the first side is less than a second length from the second end portion to the first side in a top view.

18 Claims, 21 Drawing Sheets

(58) Field of Classification Search
CPC .............. B23B 27/22; B23B 2200/325; B23B 2222/16; B23B 2224/20; B23B 2224/28; B23B 2224/36; B23B 2226/125; B23B 2226/315; B23B 27/20; B23B 27/141; B23B 2200/0428; B23B 2200/0495; B23B 2200/081; B23B 2200/161; B23B 2200/163

See application file for complete search history.

(56) References Cited

U.S. PATENT DOCUMENTS

| | | | | | |
|---|---|---|---|---|---|
| 5,044,839 | A | * | 9/1991 | Takahashi | B23B 27/143 407/114 |
| 5,476,346 | A | * | 12/1995 | Lundstrom | B23B 27/143 407/114 |
| 5,577,867 | A | * | 11/1996 | Paya | B23B 27/141 407/114 |
| 5,743,681 | A | * | 4/1998 | Wiman | B23B 27/143 407/114 |
| 5,947,651 | A | * | 9/1999 | Murakami | B23B 27/143 407/114 |
| 6,234,726 | B1 | * | 5/2001 | Okada | B23B 27/143 407/114 |
| 6,315,502 | B1 | * | 11/2001 | Maurer | B23B 27/141 407/118 |
| 6,655,881 | B2 | * | 12/2003 | Shimizu | B23B 27/145 407/113 |
| 7,429,152 | B2 | * | 9/2008 | Oles | B23B 27/065 408/145 |
| 7,520,701 | B2 | * | 4/2009 | Kukino | B23B 27/145 407/113 |
| 8,708,615 | B2 | * | 4/2014 | Edler | B23B 27/145 407/113 |
| 10,160,083 | B2 | * | 12/2018 | Watanobe | B24B 3/34 |
| 2002/0131832 | A1 | * | 9/2002 | Morsch | B23B 27/045 407/118 |
| 2005/0254909 | A1 | * | 11/2005 | Krahula | B23B 27/143 407/114 |
| 2007/0116531 | A1 | * | 5/2007 | Okita | B23B 27/143 407/114 |
| 2008/0138162 | A1 | * | 6/2008 | Webb | B23P 15/28 407/113 |
| 2008/0199263 | A1 | * | 8/2008 | Jonsson | B23B 27/1622 407/11 |
| 2008/0219784 | A1 | * | 9/2008 | Yamazaki | B23B 27/143 407/114 |
| 2008/0226405 | A1 | * | 9/2008 | Sjogren | B23B 27/145 407/114 |
| 2008/0292415 | A1 | * | 11/2008 | Kuroda | B23D 35/002 407/61 |
| 2009/0226269 | A1 | * | 9/2009 | Iyori | B23B 27/143 407/114 |
| 2011/0070039 | A1 | * | 3/2011 | Park | B23B 27/141 407/113 |
| 2012/0230785 | A1 | * | 9/2012 | Chen | B23B 27/141 407/114 |
| 2015/0090081 | A1 | * | 4/2015 | Onodera | B23B 27/143 82/1.11 |
| 2015/0283617 | A1 | * | 10/2015 | Nagarajan | B23B 27/143 407/114 |
| 2015/0375303 | A1 | * | 12/2015 | Fuju | B23B 27/143 82/1.11 |

FOREIGN PATENT DOCUMENTS

| | | | |
|---|---|---|---|
| JP | 2002126915 A | * | 5/2002 |
| JP | 2002-254214 A | | 9/2002 |
| JP | 2013-059859 A | | 4/2013 |
| JP | 2015-000446 A | | 1/2015 |
| WO | 2005/068117 A1 | | 7/2005 |
| WO | WO-2013146899 A1 | * | 10/2013 ........... B23B 27/143 |

* cited by examiner

CUTTING INSERT, CUTTING TOOL, AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2018/007199 filed on Feb. 27, 2018, which claims priority to Japanese Application No. 2017-034378 filed on Feb. 27, 2017, which are entirely incorporated herein by reference.

TECHNICAL FIELD

The present disclosure relates to a cutting insert, a cutting tool, and a method of manufacturing a machined product.

BACKGROUND ART

As a cutting insert used in machining, a throw-away tip (a cutting insert) described in WO 2005/068117 (Patent Document 1) is known. In the cutting insert described in Patent Document 1, a sintered body, which has ultra-high hardness and includes a cutting edge and a chip breaker, is joined to an apex of a main body. The chip breaker has a shape that is substantially symmetrical with respect to a cross section that bisects the apex, and includes a protruding portion and a flat portion positioned between the apex and the convex portion. A cutting insert including such a sintered body is used to cut a workpiece such as iron group metal and cast iron having high-hardness.

In recent years, due to the diversification in machining, more various materials have been listed to be used as work pieces having high hardness, such as hardened steel, hence there is a growing demand for inserts capable of cutting these various materials. In other words, there is a demand for a cutting insert capable of machining a workpiece having high hardness, such as hardened steel, and having a sintered body having ultra-high hardness capable of exhibiting favorable chip discharge performance.

An object of the present disclosure is to provide a cutting insert that exhibits favorable chip processability when a workpiece having high-hardness, such as hardened steel, is machined.

SUMMARY OF INVENTION

A cutting insert based on a non-limiting aspect of the present disclosure has a first member and a second member joined to the first member, and the second member has an upper surface including a first side, a second side, and a corner positioned between the first side and the second side, and a side surface adjacent to the upper surface. The upper surface has a first convex portion protruding and positioned to correspond to the corner, and a second convex portion extending from the first convex portion and protruding and positioned to correspond to the first side. Additionally, the second convex portion has a first end portion and a second end portion located closer to the corner than the first end portion. Additionally, a first length from the first end portion to the first side is less than a second length from the second end portion to the first side in a top view.

DESCRIPTION OF EMBODIMENT

Cutting Insert

A cutting insert according to non-limiting embodiments of the present disclosure will be described below in detail with reference to the drawings. Note that, for convenience of description, the figures referenced below may illustrate, in a simplified manner, main members, from among constituent members of embodiments, required for describing the embodiments. Accordingly, the cutting insert of the present disclosure may be provided with an optional constituent member that is not illustrated in the referenced figures. Additionally, dimensions of the members in each figure may be illustrated as examples for the cutting insert of the present disclosure. Hence, the cutting insert of the present disclosure is not limited by the dimensions of the members in each figure.

First Embodiment

Figure 1:
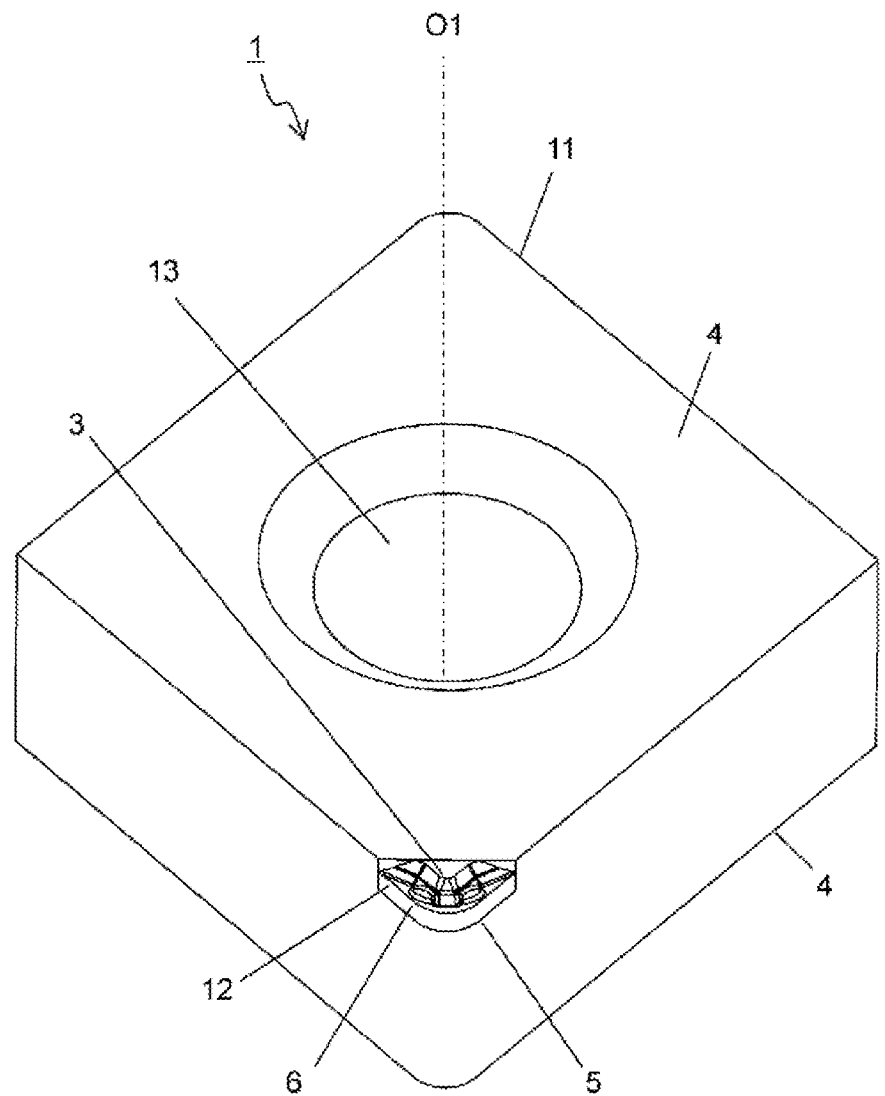
FIG. 1 is a perspective view illustrating a cutting insert according to a non-limiting embodiment of the present disclosure.

With reference to FIGS. 1 to 13, description will be given below of a cutting insert 1 (also referred to below simply as an insert 1) according to First Embodiment of the present disclosure. As illustrated in FIG. 1, the insert 1 of a non-limiting of the present disclosure may be an insert used in lathing and may be shaped like a polygonal plate, and more specifically a quadrangular plate. As illustrated in FIGS. 1 to 4, the insert 1 may have a main body 11 (a first member) and a sintered body portion 12 (a second member) having ultra-high hardness and joined to the body 11. The main body 11 may be a portion of the insert 1 to be used primarily to attach the insert 1 to a holder. The sintered body portion 12 may be a portion of the insert 1 to be primarily involved in cutting.

More specifically, in an example illustrated in FIG. 1, the main body 11 may be substantially shaped like a quadrangular plate including two main surfaces 4 each including four corners. The sintered body portion 12 may be positioned at a portion corresponding to one corner of one of the two main surfaces 4. That is, the main body 11 may have a concave portion positioned at a portion corresponding to a corner of one of the two main surfaces 4, and the sintered body portion 12 may be positioned in the concave portion. In this case, the sintered body 12 may be joined to the main body 11.

Additionally, the other of the two main surfaces 4 can function as a bearing surface to be attached to a holder when the insert 1 is attached to the holder. The two main surfaces 4 may be positioned away from each other, so that it could be said that one of the main surfaces 4 may be positioned opposite to the other of the main surfaces 4.

The sintered body portion 12 in the example illustrated in FIG. 1 may be shaped like a triangular plate, and may have an upper surface 3, a lower surface 5 positioned opposite to the upper surface 3, and a side surface 6 adjacent to the upper surface 3. The upper surface 3 in an example illustrated in FIG. 2 may have a first side 3b1, a second side 3b2, and a corner 3a positioned between the first side 3b1 and the second side 3b2. In other words, in the example illustrated in FIG. 2, the upper surface 3 may have the corner 3a, and the first side 3b1 and second side 3b2 each extending from the corner 3a.

The upper surface 3 may be a surface, on which chips flow mainly during machining, and may function as a so-called "rake surface." Additionally, as described below, the upper surface 3 may be positioned on an upper side of a cutting tool 101 in a configuration where the insert 1 is attached to the holder, and is thus referred to as an upper surface. However, the present embodiments are not limited this configuration. That is, the upper surface 3 need not to be positioned on the upper side of the cutting tool 101.

Figure 2:
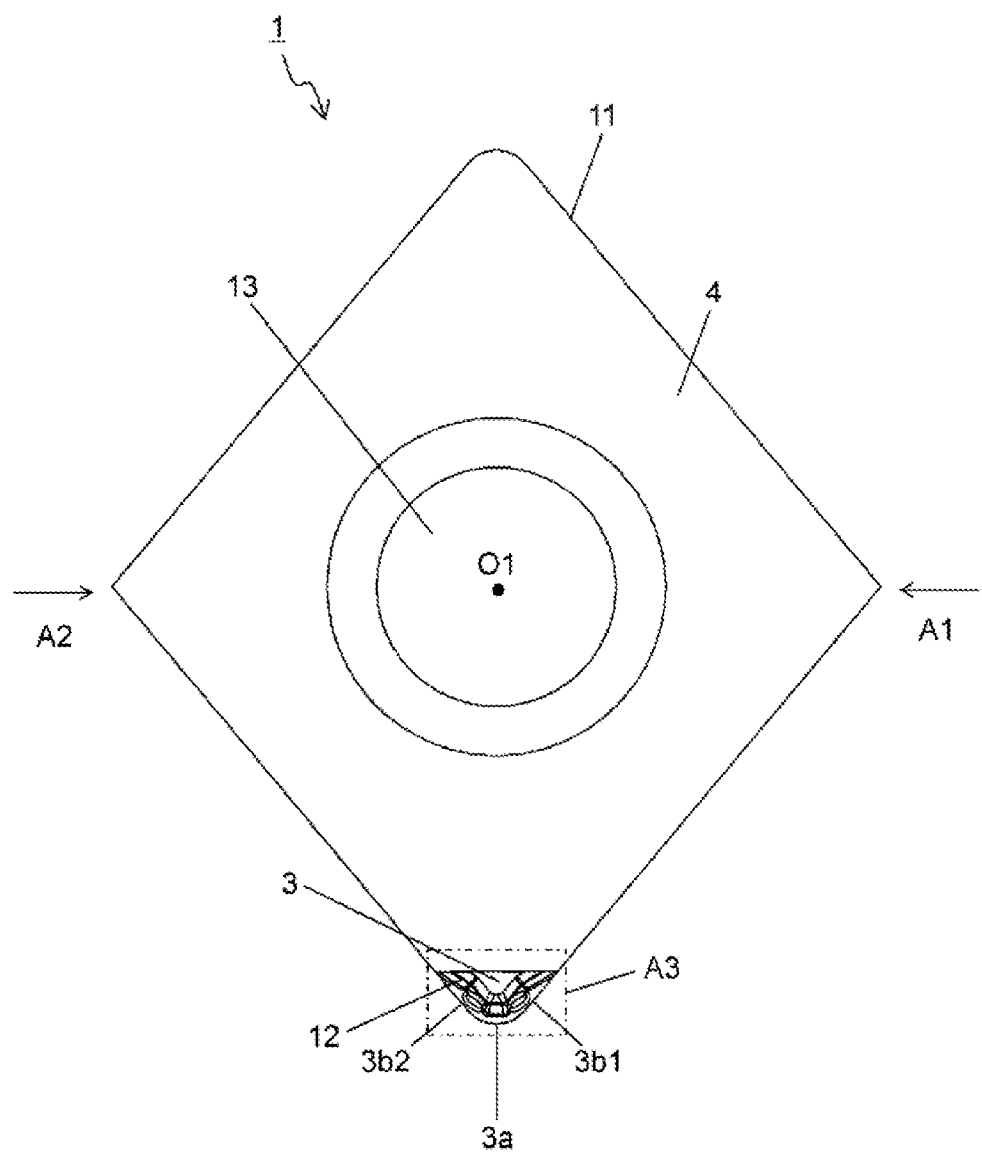
FIG. 2 is a top view of the cutting insert illustrated in FIG. 1.

It may be only required that the upper surface 3 has a polygonal shape as illustrated in FIG. 2, and may have a plurality of corners and a plurality of sides in a top view. The upper surface 3 in the example illustrated in FIG. 2 may have a triangular shape and may have at least the corner 3a, the first side 3b1, and the second side 3b2.

Here, the polygonal shape may not strictly mean a shape of a polygon. The corner 3a of the upper surface 3 is not limited to a strictly sharp corner. Additionally, sides positioned to connect adjacent corners need not to be strictly straight lines. For example, the corner 3a illustrated in FIG. 2 may be shaped like a curve that is convex outward in the top view. Additionally, the top view may illustrate a state in which the upper surface 3 of the insert 1 is viewed from the front.

In the examples illustrated in FIGS. 1 and 2, the main surface 4 of the main body 11 can also be described as a flat planar region positioned inward of the upper surface 3 of the sintered body portion 12.

Note that the main surface 4 in the example illustrated in FIG. 1 may have a quadrilateral shape, but the shape of the main surface 4 is not limited to this. For example, the main surface 4 may be shaped like a triangle or a pentagon. Here, "inner" as used herein may refer to a side positioned, near the center of the upper surface (i.e., the main surface 4 of the main body 11 and the upper surface 3 of the sintered body portion 12) of the insert 1 and away from the corner 3a, the first side 3b1, and the second side 3b2 in the top view.

The lower surface 5 may be positioned away from the upper surface 3 with the side surface 6 interposed therebetween, and in the example illustrated in FIG. 1, the lower face 5 of the sintered body part 12 may be in contact with the main body 11. The lower surface 5 may be the main surface of the sintered body portion 12 to be joined to the main body 11.

Figure 3:
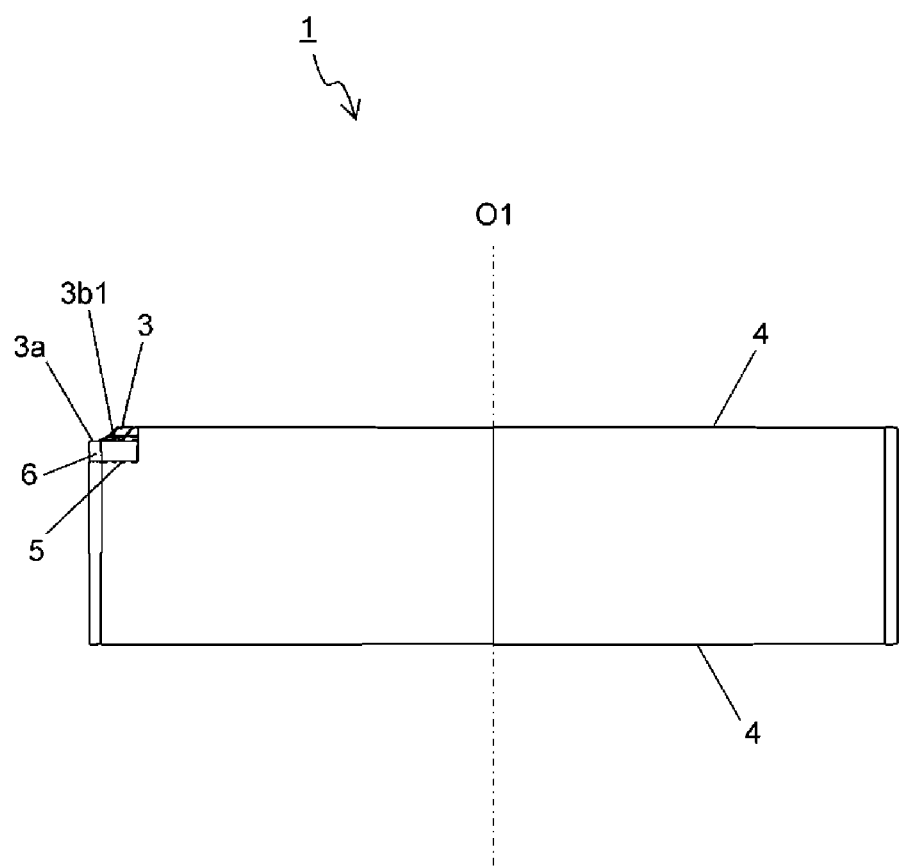
FIG. 3 is a side view of the cutting insert illustrated in FIG. 2 when viewed from a direction A1 in FIG. 2.
Figure 4:
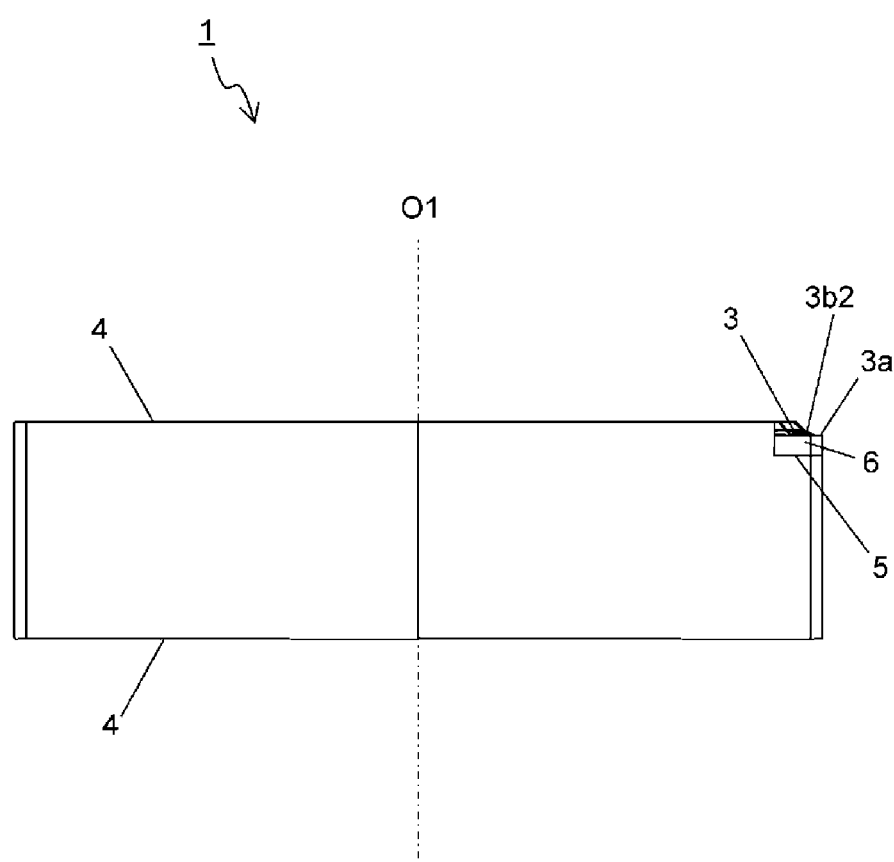
FIG. 4 is a side view of the cutting insert illustrated in FIG. 2 when viewed from a direction A2 in FIG. 2.

As illustrated in FIGS. 1 and 3, the side surface 6 may be positioned between the upper surface 3 and the lower surface 5 and may adjacent to the upper surface 3 and the lower surface 5. Note that, in a case where the upper surface 3 is shaped like a polygon including a plurality of corners and a plurality of sides, the side surface 6 may have a plurality of surfaces, and the surfaces may be configured to have flat planar regions.

FIG. 1 may illustrate an example in which one surface constituting the side surface 6 is a flat surface and is in contact with the main body 11. The side surface 6 may function as a so-called "flank surface" in a case where a workpiece is machined using the insert 1 of the present disclosure.

As illustrated in FIGS. 1 and 2, the insert 1 may have a through-hole 13 that opens in the center of one of the main surfaces 4 and in the center of the other of the main surfaces 4. A member for securing the insert 1 to the holder of the cutting tool may be inserted into the through-hole 13. Examples of the member may have a screw member and a clamping member.

A central axis of the through-hole 13 may coincide with an imaginary straight line (central axis O1) passing through the centers of the two main surfaces 4. Additionally, the central axis of the through-hole 13 may coincide with the central axis O1 of the insert 1. In a case where the central axis of the through-hole 13 also coincides with the central axis O1 of the insert 1, the central axis of the through hole 13 may be replaced with the central axis O1 of the insert 1. Additionally, also in a case where it is difficult to identify the central axis O1 of the insert 1, the central axis of the through-hole 13 may be replaced with the central axis O1 of the insert 1. The central axis O1 of the insert 1 may be an axis penetrating the two main surfaces 4.

Examples of a material of the main body 11 may include cemented carbide alloy and cermet. Examples of the composition of the cemented carbide alloy may include WC—Co, WC—TiC—Co, and WC—TiC—TaC—Co. WC—Co may be produced by adding a cobalt (Co) powder to tungsten carbide (WC) and sintering this mixture. WC—TiC—Co may be formed by adding titanium carbide (TiC) to WC—Co. WC—TiC—TaC—Co may be formed by adding tantalum carbide (TaC) to WC—TiC—Co. Additionally, cermet may be a sintered composite material obtained by combining a metal with a ceramic component. Specifically, examples of the cermet may include compounds in which a titanium compound, such as titanium carbide (TiC) or titanium nitride (TiN), may be used as a primary component.

The surface of the main body 11 may be coated with a coating film by using a Chemical Vapor Deposition (CVD) method or a Physical Vapor Deposition (PVD) method.

Examples of composition of the coating film may include titanium carbide (TiC), titanium nitride (TiN), titanium carbonitride (TiCN), and alumina ($Al_2O_3$).

Examples of the material of the sintered body portion 12 may include cBN sintered bodies and diamond sintered bodies.

The sintered body portion 12 that may be primarily involved in cutting in the insert 1 will be described in detail below.

As described above, the sintered body portion 12 in the example illustrated in FIG. 1 may have the upper surface 3, the lower surface 5, and the side surface 6. In addition, the sintered body portion 12 in the example illustrated in FIG. 1 may have a cutting edge 2 positioned on at least a portion of a ridge line at which the upper surface 3 and the side surface 6 meet. More specifically, in an example illustrated in FIG. 2, the cutting edge 2 may be positioned at a portion of the ridge line where the upper surface 3 and the side surface 6 meet, with this portion corresponding to the corner 3a, the first side 3b1, and the second side 3b2.

The cutting edge 2 may be used to cut a workpiece during cut processing. Note that a so-called honing process may be performed on a region where the upper surface 3 and the side surface 6 meet and where the cutting edge 2 is positioned. In a case where the region where the first surface 3 and the side surface 6 meet is honed into a curved shape, the cutting edge 2 may have an increased strength. Examples of the honing process may include R-honing.

In addition, in the example illustrated in FIG. 2, the cutting edge 2 may be positioned on the portion of the ridge line where the upper surface 3 and the side surface 6 meet, with this portion corresponding to the corner 3a, the first side 3b1, and the second side 3b2. However, the present embodiments are not limited to this configuration. For example, the cutting edge 2 may be positioned on a portion of the ridge line where at least the upper surface 3 and the side surface 6 meet, with this portion corresponding to the corner 3a as well as only a part of the first side 3b1.

Figure 5:
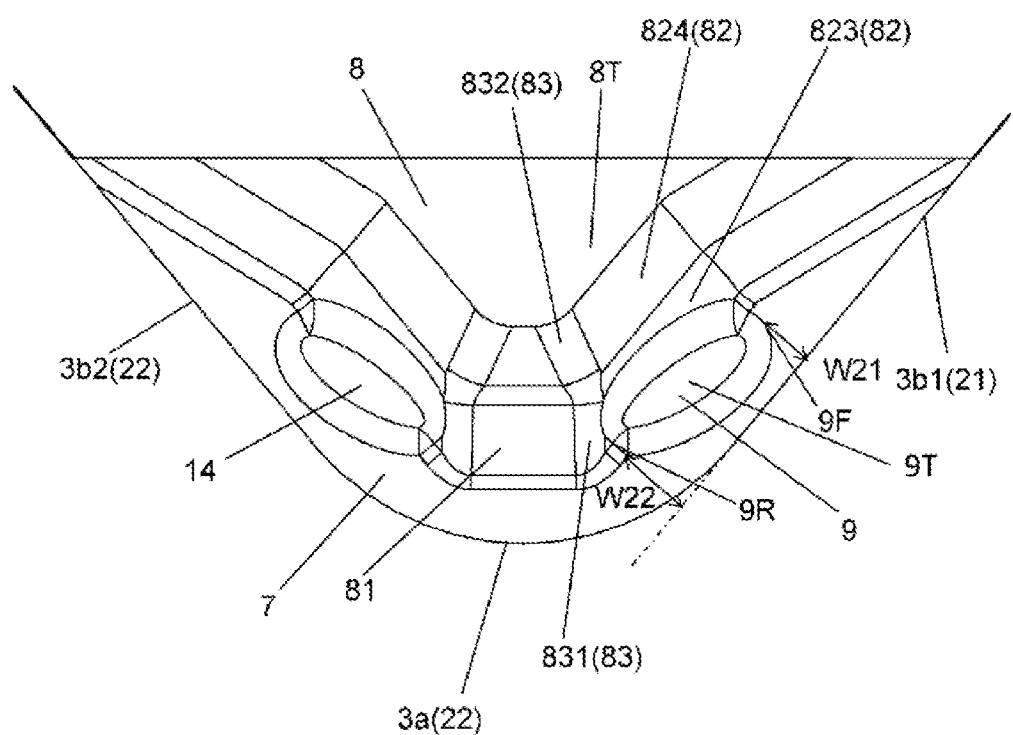
FIG. 5 is an enlarged view of a region A3 in FIG. 2.

As illustrated in FIG. 5, the cutting edge 2 may have a first cutting edge 21 positioned on the first side 3b1 of the upper surface 3. The first cutting edge 21 may function as a so-called a "main cutting edge." Additionally, the cutting edge 2 may have a second cutting edge 22 positioned on the corner 3a. The second cutting edge 22 may function as a so-called a "corner cutting edge."

In examples illustrated in FIGS. 5 to 13, the upper surface 3 may have an edge portion 7 that extends along the cutting edge 2, a first convex portion 8, and a second convex portion 9.

The edge 7 may be positioned along the corner 3a, the first side 3b1, and the second side 3b2, which are included in the upper surface 3. The edge 7 may be inclined upward as the edge 7 moves away from the ridge portion 2 or a height of the edge 7 may be same as the ridge portion 2. The edge portion 7 in the examples illustrated in FIGS. 5 to 10 may be a flat planar region, in which the height from the lower surface 5 is substantially constant. Specifically, the edge portion 7 may be a flat planar region connected to the cutting edge 2 and extending inwardly from the cutting edge 2.

The first convex portion 8 and the second convex portion 9 may be both convex and may be raised upward relative to the lower surface 5. Additionally, the first convex portion 8 and the second convex portion 9 may be both positioned inward of the cutting edge 2 of the upper surface 3. The first convex portion 8 and the second convex portion 9 may be positioned in a direction, in which chips resulting from cutting by the cutting edge 2 flow, and may be used to control the flow of chips. That is, the first convex portion 8 and the second convex portion 9 may have a role of curving the chips or controlling the direction in which chips flow.

More specifically, the first convex portion 8 may be positioned to correspond to the corner 3a and protrudes upward. In the examples illustrated in the FIGS. 5 to 7, the first convex portion 8 may protrude toward the corner 3a and may protrude in a direction away from the lower surface 5 in the top view. The first convex portion 8 may be a portion along which chips, resulting from cutting by the cutting edge 2 positioned mainly at the corner 3a, pass. More specifically, in the present disclosure, the first convex portion 8 may be positioned at a large distance from the corner 3a (the cutting edge 2) of the upper surface 3 due to the intervening presence of the edge portion 7. The first convex portion 8 may be inclined to be away from the lower surface 5 as the first part 831 and the second part 832 move away from the corner 3a.

The second convex portion 9 may extend from the first convex portion 8 and may be positioned to correspond to the first side 3b1 and moreover protrudes upward. Specifically, in the examples illustrated in FIGS. 5 to 7, the second convex portion 9 may be in contact with the edge portion 7 and the first convex portion 8. Additionally, the second convex portion 9 may be positioned closer to the first side 3b1 than to a center point of the corner 3a. Additionally, the second convex portion 9 may protrude in a direction away from the lower surface 5. The second convex portion 9 may be a portion along which chips, resulting from cutting by the cutting edge 2 positioned mainly on the first side 3b1, pass.

More specifically, in the present disclosure, the second convex portion 9 may extend from the first convex portion 8 and may have a substantially elliptical shape in the top view. The major axis direction of the elliptical shape corresponds to the first side 3b1. In other words, the major axis direction of the elliptical shape may be a direction along the first side 3b1. Additionally, similar to the first convex portion 8, the second convex portion 9 may be positioned away from the first side 3b1 (the cutting edge 2) due to the intervening presence of the edge portion 7. Additionally, the second convex portion 9 may have a tip end portion 9F (a first end portion) and a rear end portion 9R (a second end portion) located closer to the corner 3 than the tip end portion 9F.

Additionally, in FIG. 5, a length (a first length) W21 from the tip end portion 9F of the second convex portion 9 to the first side 3b1 may be less than a length (a second length) W22 from the rear end portion 9R of the second convex portion 9 to the first side 3b1 in the top view.

With the insert 1 having such a configuration, the first convex portion 8 and the second convex portion 9 may allow chips to be favorably curled regardless of a feed rate in low-cutting processing in which a cutting amount corresponds to less than or equal to a length of the corner 3a. In particular, for materials having high hardness and high separability, there may be a high demand for machining to be performed with a small cutting amount. Thus, in machining of materials having high-hardness, how to compactly curl resultant chips is important in machining to be performed with a small cutting amount.

In such processing on materials having high-hardness, the insert 1 configured as described above may cause the second convex portion 9 positioned in proximity to the cutting edge 2 to favorably curl resultant chips. Thus, favorable chip discharge performance may be achieved.

Here, in the present disclosure, the rear end portion 9R of the second convex portion 9 may be one of both the end portions of the second convex portion 9 in the extending direction, with this one end portion being positioned closer to the corner 3a in the top view. Specifically, the rear end portion 9R of the second convex portion 9 may be one of both the end portions of the second convex portion 9 in the extending direction, with this one end portion being positioned near the center point of the corner 3a in the top view.

Similarly, the tip end portion 9F of the second convex portion 9 may be one of both the end portions of the second convex portion 9 in the extending direction, with this one end portion being positioned away from the corner 3a in the top view. Specifically, the tip end portion 9F of the second convex portion 9 may be one of both the end portions of the second convex portion 9 in the extending direction, with this one end portion being positioned away from the center point of the corner 3a in the top view. Note that in the present disclosure, the extending direction of the second convex portion 9 can be considered as the major axis direction of the elliptical shape described above.

Figure 14:
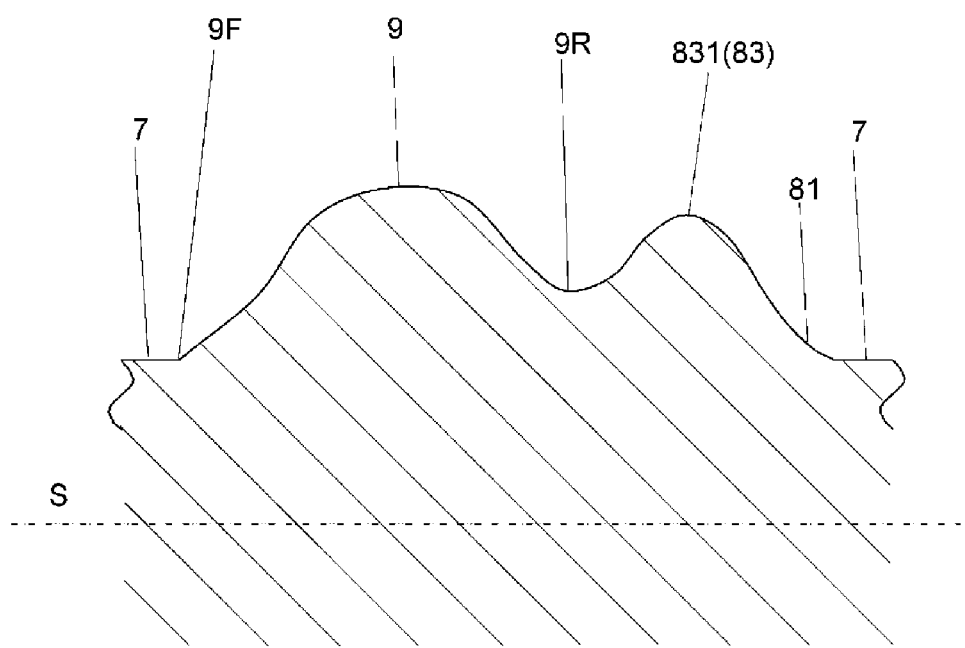
FIG. 14 is a C7 cross-sectional view of the cutting insert illustrated in FIG. 7.

A C7 cross section in an example illustrated in FIG. 14 may be a cross section passing through the tip end portion 9F and the rear end portion 9R of the second convex portion 9 along the central axis O1. In the example illustrated in FIG. 14, the tip end portion 9F may be connected to the edge portion 7. The rear end portion 9R may be connected to a first part 831.

Additionally, the present embodiments are not limited to the above-described aspect, and the tip end portion 9F may be connected to a third part 823, which will be described later. The rear end portion 9R may be connected to the edge portion 7.

Additionally, the first length W21 and the second length W22 can also be defined as follows. That is, for example, the first length W21 may be a length from the tip end portion 9F of the second convex portion 9 to the first side 3b1 in a direction orthogonal to the first side 3b1 in the top view. The second length W22 may be a length from the rear end portion 9R of the second convex portion 9 to the first side 3b1 in the direction orthogonal to the first side 3b1 in the top view.

In a direction along the central axis O1 of the insert 1, "upward" may be defined as a direction from the lower surface 5 toward the upper surface 3, whereas "downward" is defined as a direction from the upper surface 3 toward the lower surface 5. Such being the case, the height position of each component of the upper surface 3 may be set. For example, the wording "the first convex portion 8 protrudes upward" may mean that the first convex portion 8 protrudes in a direction away from the lower surface 5. Note that, for convenience, the height direction as used herein may be defined as a direction orthogonal to the main surface 4.

In the example illustrated in FIG. 5, the second convex portion 9 may be connected to the first convex portion 8. More specifically, the rear end portion 9R of the second convex portion 9 may be connected to the first convex portion 8. According to such a configuration, the second convex portion 9 may have an increased strength.

Furthermore, in this case, the second convex portion 9 may be inclined with respect to the first side 3b1 to close to the first side 3b1 as the second convex portion 9 moves away from the corner 3a in the top view. In such a case, the second convex portion 9 may enhance the effect of improving chip discharge performance.

Here, the meaning of the second convex portion 9 being inclined with respect to the first side 3b1 and being extended may be as follows. That is, when a straight line connecting the tip end portion 9F and the rear end portion 9R of the second convex portion 9 is designated as a straight line L9 that indicates the extending direction of the second convex portion 9, the straight line L9 may be inclined with respect to the first side 3b1. Such arrangement may allow favorable chip processing performance to be exhibited in a case where cutting is performed with a small cutting amount and at a high feed rate.

Note that the second convex portion 9 being inclined to close to the first side 3b1 as the second convex portion 9 moves away from the corner 3a may mean that the length from the second convex portion 9 to the first side 3b1 does not increase in accordance with an increase in separation from the corner 3a. Accordingly, the second convex portion 9 need not to be inclined so as to approach the first side 3b1 over the entire length of the second convex portion 9, and may have a portion in which a length from the second convex portion 9 to the first side 3b1 is constant.

Additionally, an upper end 9T of the second convex portion 9 may be positioned lower than an upper end 8T of the first convex portion 8. In other words, a height of the upper end 9T of the second convex portion may be lower than a height of the upper end 8T of the first convex portion 8. According to such a configuration, there may be no relatively high convex portion near the cutting edge 2, and this may make an occurrence of blockage with resultant chips less likely.

Note that, for example, in the examples illustrated in FIGS. 10 to 13, the upper end 9T of the second convex portion 9 can be evaluated in a cross section perpendicular to the cutting edge 2. That is, the upper end 9T of the second convex portion 9 may be a portion of the second convex portion 9 located at an uppermost position in the height direction. In other words, the upper end 9T of the second convex portion 9 may be a portion of the second convex portion 9 positioned farthest from the lower surface 5 in the height direction. In the example illustrated in FIG. 11, the second convex portion 9 may have a curved surface that is convex upward, and thus, the upper end 9T of the second convex portion 9 may be substantially equivalent to a single point.

Similarly, the upper end 8T of the first convex portion 8 may be a portion of the first convex portion 8 that is positioned most upward in the height direction. In other words, the upper end 8T of the first convex portion 8 may be a portion of the first convex portion 8 that is positioned farthest from the lower surface 5 in the height direction.

Figure 6:
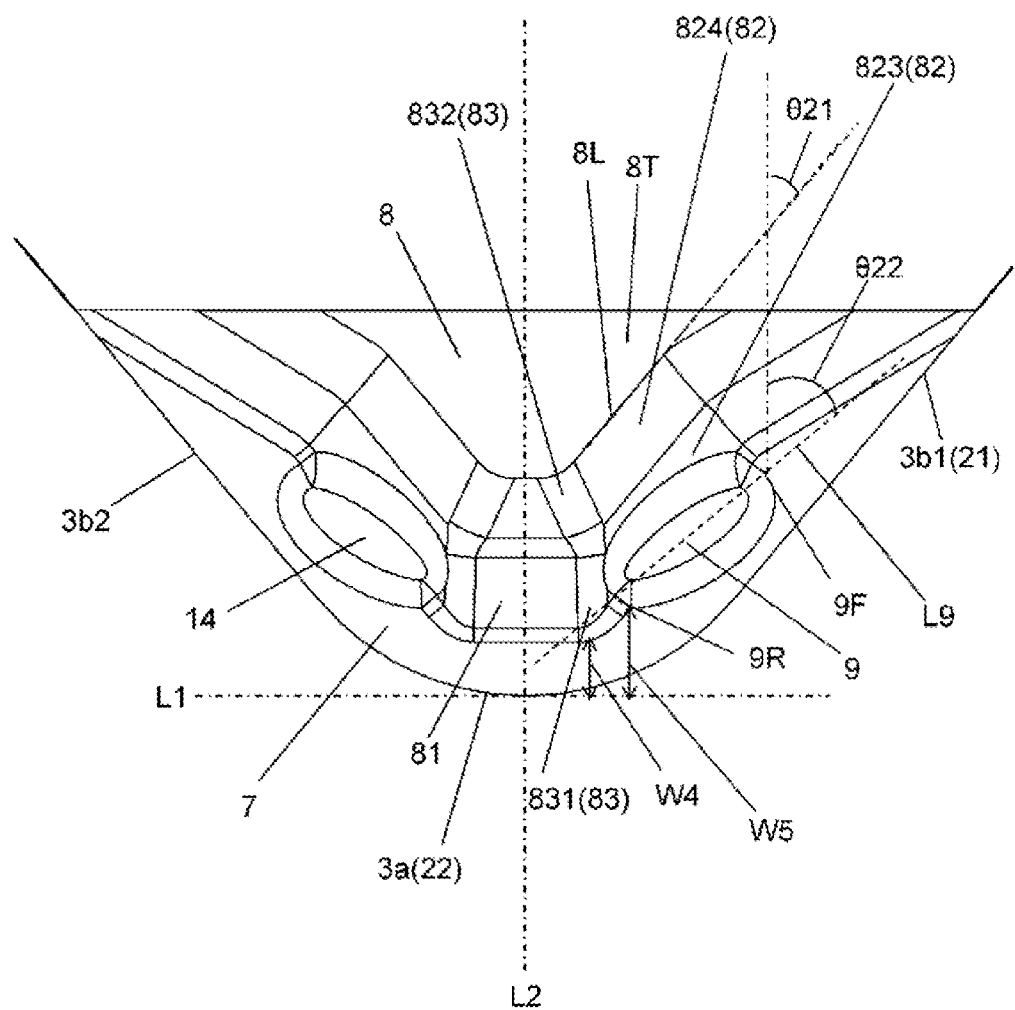
FIG. 6 is a diagram illustrating the same region as that in FIG. 5.
Figure 7:
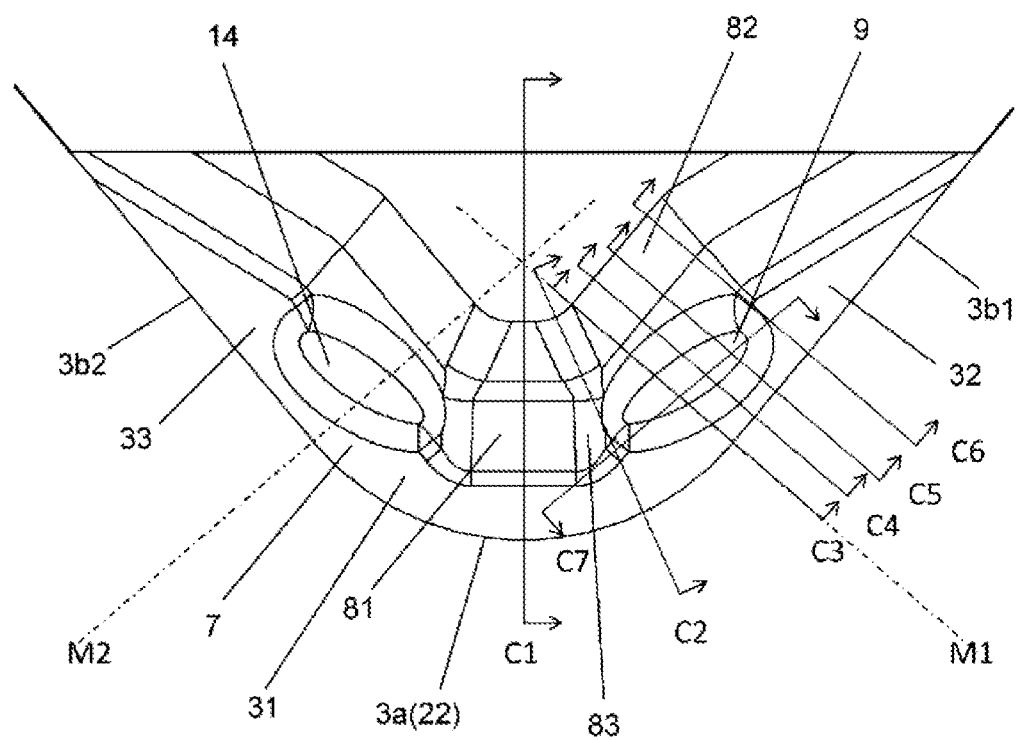
FIG. 7 is a diagram illustrating the same regions as that in FIG. 5.
Figure 8:
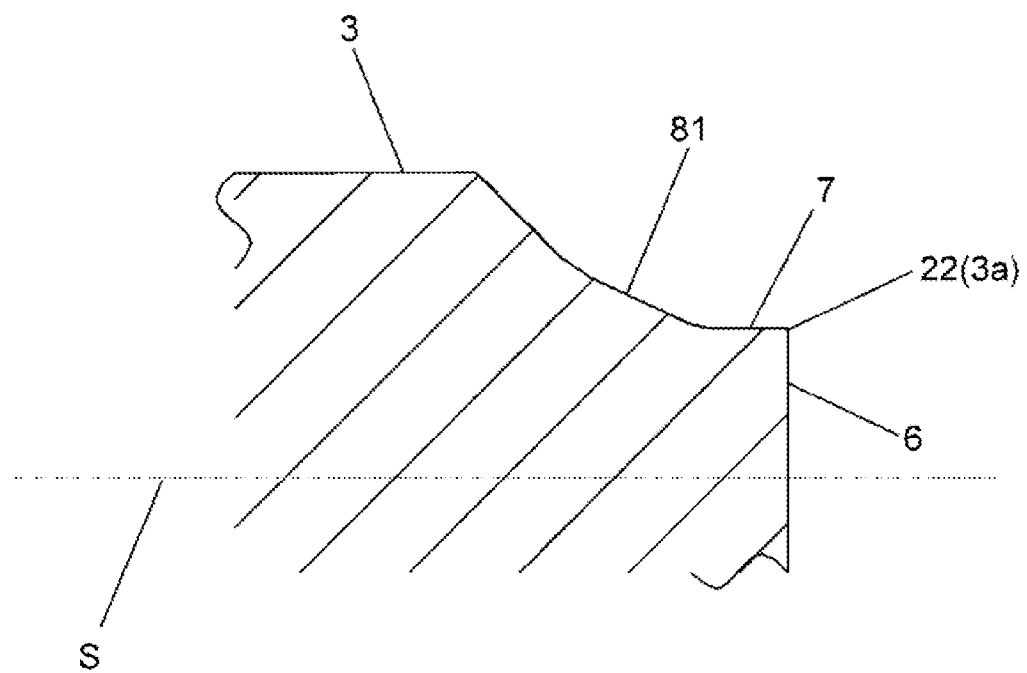
FIG. 8 is a C1 cross-sectional view of the cutting insert illustrated in FIG. 7.

Additionally, as illustrated in FIG. 6, the first convex portion 8 may be also positioned to correspond to the first side 3b1. In other words, the first convex portion 8 may have a portion along the first side 3b1. In this case, the first convex portion 8 may have a first portion 81 corresponding to the corner 3a, a second portion 82 corresponding to the first side 3b1, and a third portion 83 (hereinafter, also referred to as a first ridge portion) positioned between the first portion 81 and the second portion 82. In other words, the first convex portion 8 may have the first portion 81 that is positioned along the corner 3a.

As described above, the first convex portion 8 may have the second portion 82 positioned along the first side 3b1. Additionally, the first convex portion 8 may have the third portion (a first ridge portion) 83 positioned between the first portion 81 and the second portion 82.

In this case, the third portion 83 may be considered as a ridge portion that is positioned at a portion, where the first portion 81 and the second portion 82 meet, and has an upward-convex curved surface. Additionally, the third portion 83 may be considered as a ridge portion that is positioned at a portion, where the first portion 81 and the second portion 82 meet, and has a convex curved-surface at the corner 3a. Furthermore, a length W4 from the third portion 83 to the straight line L1 described below may be less than a length W5 from the rear end portion 9R of the second convex portion 9 to the straight line L1 in the top view.

According to such a configuration, during high feed processing, blockage with chips caused by the second convex portion 9 approaching the cutting edge 2 may be unlikely to occur, and this may lead to improved chip discharge performance. Here, the length W4 and the length W5 can be defined as follows. That is, as illustrated in FIG. 6, the length W4 may be a length from a lower end of the third portion 83, through the center point of the corner 3a, to a straight line (a tangent to the corner 3a passing through the center point of the corner 3a) L1 orthogonal to a bisecting line L2 of the corner 3a in the top view.

More specifically, the length W4 may be the shortest distance between the lower end of the third portion 83 and the straight line L1 in a direction along the straight line L2. Similarly, the length W5 may be the shortest distance between the tip end portion 9F of the second convex portion 9 and the straight line L1 in the direction along the straight line L2.

Additionally, here, the lower end 83D of the third portion 83 and the lower end 9D of the second convex portion 9 can be defined similarly to the upper end 8T of the first convex portion 8 and the upper end 9T of the second convex portion 9 described above. That is, for example, the lower end 83D of the third portion 83 may be a portion of the third portion 83 located at a lowermost position in the height direction. The third portion 83 may be inclined to be away from the lower surface 5 as the third portion 83 moves away from the corner 3a. The lower end 83D of the third portion 83 may also be designated as a tip of the third portion 83.

Furthermore, the upper end 9T of the second convex portion 9 may be positioned lower than the upper end 83T of the third portion 83. In other words, the height of the upper end 9T of the second convex portion 9 may be lower than a height of the upper end 83T of the third portion 83. According to such a configuration, in cut processing to be performed at a medium feed rate, resultant chips can be favorably curled by the third portion 83 positioned higher than the second convex portion 9.

Here, the upper end 83T of the third portion 83 can be defined similarly to the upper end 8T of the first convex portion 8 and the upper end 9T of the second convex portion 9 described above.

Furthermore, the third portion 83 may be bent so as to be convex outward with respect to the bisecting line L2 of the corner 3a in the top view as illustrated in FIG. 6. According to such a configuration, in a case where resultant chips extend and flow upward without being sufficiently curled, blockage with chips that results from hard contact of the chips with a fourth part 824 (described below) of the first convex portion 8 having a relatively steep inclination angle may be less likely to occur. Thus, favorable chip discharge performance can be exhibited in processing that ranges from low-feed rate to high-feed rate processing operations.

Here, note that the third portion 83 being bent so as to be convex outward may mean, in other words, that a center portion of the third portion 83 is positioned outward (in the direction from the bisecting line L2 toward the first side 3b1) of a straight line connecting the upper end 83T and the lower end 83 D of the third portion 83 in the top view. That is, this may mean that a length from the bisecting line L2 to the center portion of the third portion 83 is greater than a length from the bisecting line L2 to the upper end 83T and a length from the bisecting line L2 to the lower end 83D.

Additionally, the third portion 83 may be bent so as to protrude toward the corner 3a. The configuration described above may cause chips to be favorably curled in the top view. Thus, the insert 1 may deliver favorable chip discharge performance. Additionally, the third portion 83 may have a convexly curved surface along the corner 3a. Specifically, in a cross section parallel to the lower face 5, the third portion 83 may have a convex curve.

The third portion 83 may have a first part 831 and a second part 832. In this case, the first part 831 and the second part 832 may be inclined away from the lower surface 5 as the first part 831 and the second part 832 move away from the corner 3a. Furthermore, an inclination angle of the second part 832 with respect to the lower surface 5 may be greater than an inclination angle of the first part 831 with respect to the lower surface 5. The first part 831 may be positioned relatively near the corner 3a (on the side of the corner 3a). The second 832 may be positioned relatively away from the corner 3a (inward of the first portion 81).

The second convex portion 9 may have a first inclined surface 91 inclined away from the lower surface 5 as the second convex portion 9 move away from the first side 3b1. In this case, a reference plane S may be set that is orthogonal to the central axis O1 of the main body 11. A first angle $\theta 11$ of the first part 831 with respect to the reference plane S and a second angle $\theta 12$ of the second part 832 with respect to the reference plane S may be smaller than a third angle $\theta 1$ of the first inclined surface 91 with respect to the reference plane S.

According to such a configuration, during high feed processing, the third portion 83 may be less likely to inhibit the discharge of the chips curled by the second convex portion 9, and a favorable chip processing can be performed.

Figure 9:
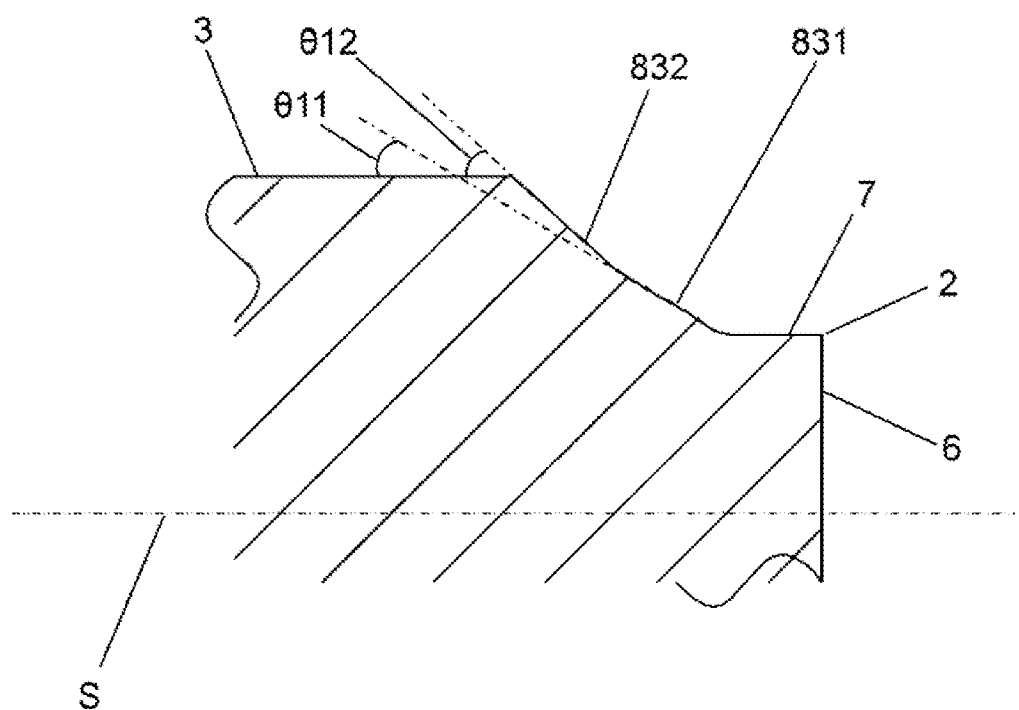
FIG. 9 is a C2 cross-sectional view of the cutting insert illustrated in FIG. 7.
Figure 10:
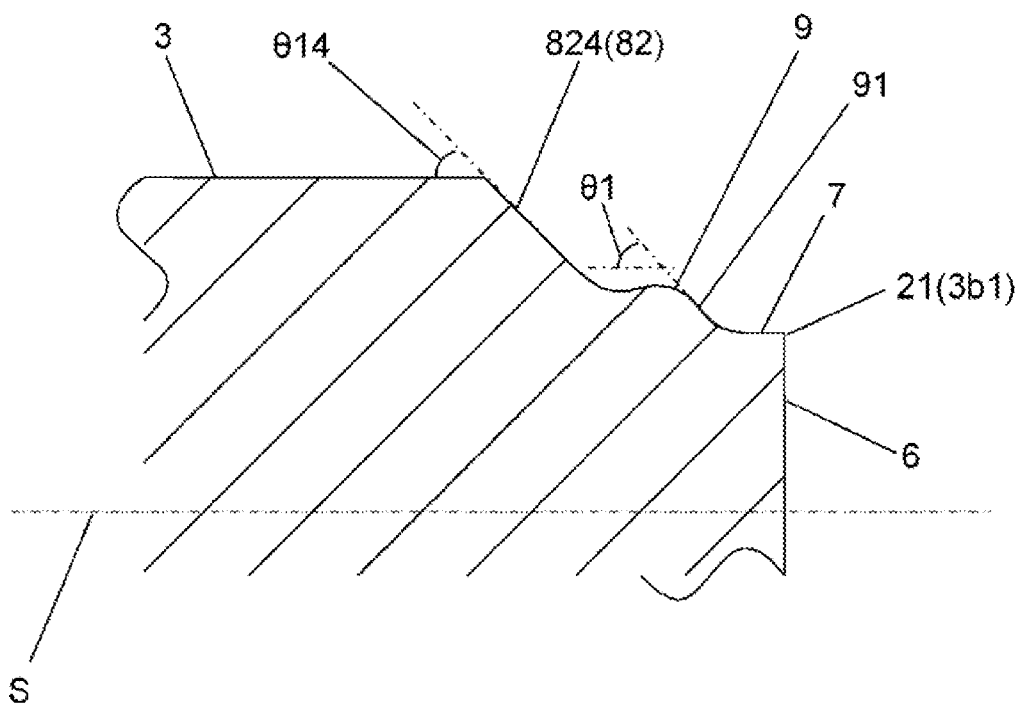
FIG. 10 is a C3 cross-sectional view of the cutting insert illustrated in FIG. 7.
Figure 11:
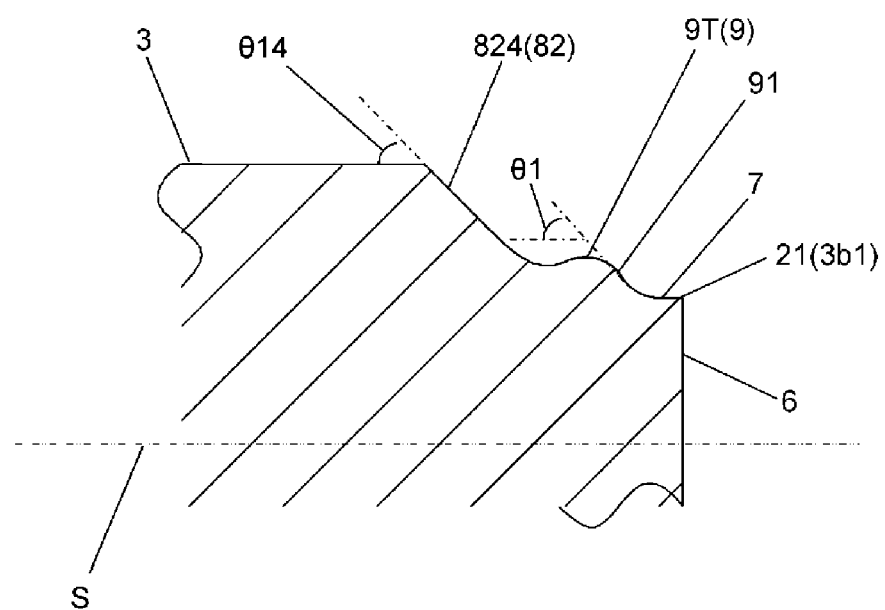
FIG. 11 is a C4 cross-sectional view of the cutting insert illustrated in FIG. 7.
Figure 12:
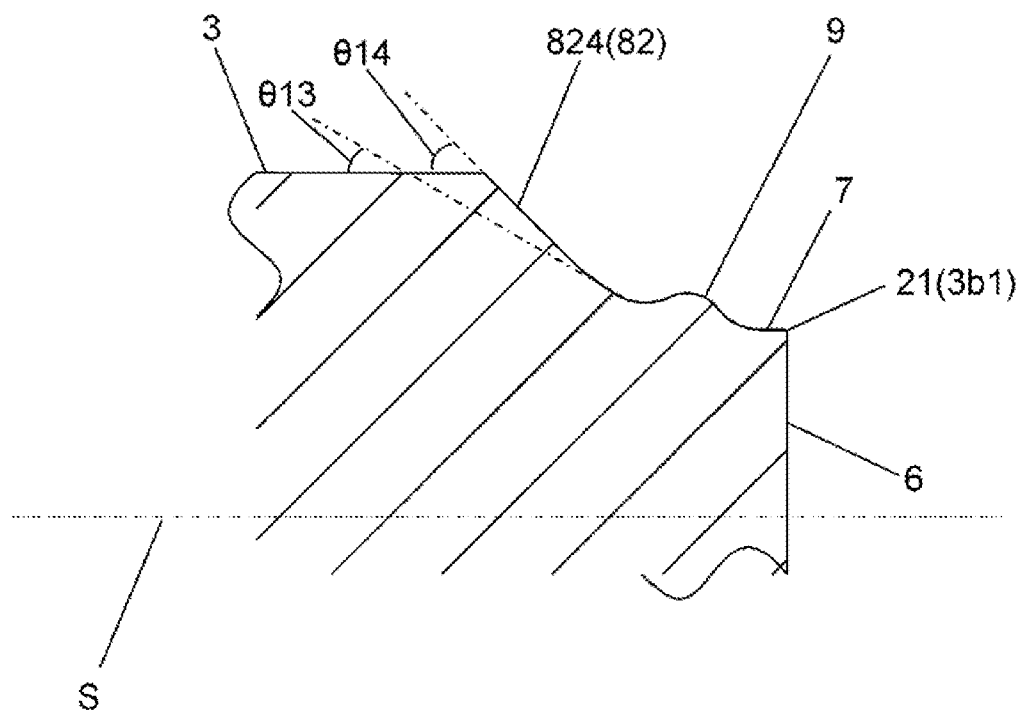
FIG. 12 is a C5 cross-sectional view of the cutting insert illustrated in FIG. 7.
Figure 13:
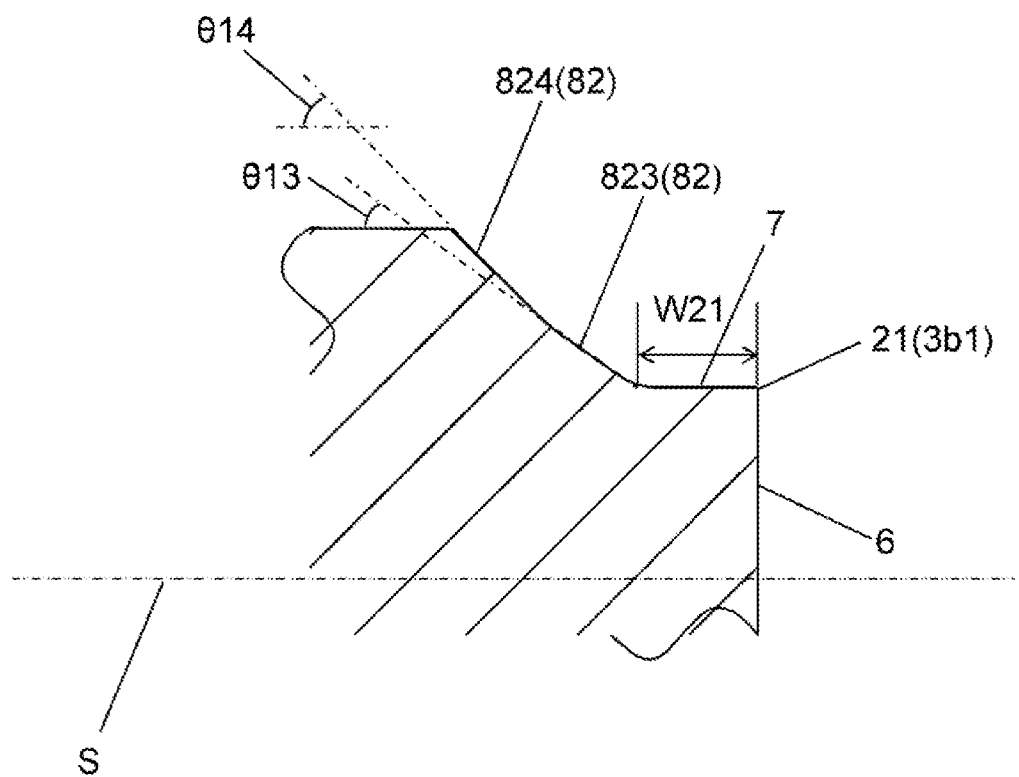
FIG. 13 is a C6 cross-sectional view of the cutting insert illustrated in FIG. 7.

Here, the inclination angles $\theta 1$, $\theta 11$, and $\theta 12$ may correspond to so-called "rising angles", and as illustrated in FIGS. 9 to 11, the inclination angles $\theta 1$, $\theta 11$, and $\theta 12$ can be defined as follows in a cross section perpendicular to the cutting edge 2. That is, as illustrated in FIG. 10, the third angle $\theta 1$ may be an inclination angle of a first inclined surface 91 with respect to the reference plane S orthogonal to the central axis (center O1 of the through-hole 13 or the central axis O1 of the body 11) of the insert 1.

Similarly, the first angle $\theta 11$ and the second angle $\theta 12$ may be inclination angles of the first part 831 and the second part 832 with respect to the reference plane S, respectively. Hereinafter, the inclination angles of the components described in the specification can be defined in a similar manner. For example, the third angle $\theta 1$ may range from 50° to 80°, the first angle $\theta 11$ may range from 10° to 30°, and the second angle $\theta 12$ may range from 30° to 60°.

In this case, the first angle $\theta 11$ of the first part 831 may be smaller than the second angle $\theta 12$ of the second part 832. In a case where such a relationship is satisfied, during high feed processing, blockage with chips that are curled by the second convex portion 9 and subjected to hard contact with the first part 831 may be less likely to occur.

Additionally, the upper end 9T of the second convex portion 9 may be positioned lower than a lower end 832D of the second part 832. In other words, the height of the upper end 9T of the second convex portion 9 may be less than a height of the lower end 832D of the second part 832. According to such a configuration, favorable chip discharge performance can also be exhibited in machining to be performed with a medium cutting amount and at a medium feed rate.

The first part 831 and the second part 832 each may have a convexly curved surface. Such a configuration can increase an area in which chips come into contact with the upper surface 3 when the chips flow over the upper surface 3 that functions as a rake surface. Thus, the chips can flow stably on the upper surface 3 that functions as a rake surface.

Additionally, the second portion 82 may have the third part 823 that is inclined to be away from the lower surface 5 as the third part 823 moves away from the first side 3b1 and that is positioned near the first side 3b1 (on a side of the first side 3b1), and the fourth part 824 located farther from the first side 3b1 (inward of the third part 823) than the third part 823.

In this case, the third part 823 and the fourth part 824 may be inclined away from the lower surface 5 as the third part 823 and the fourth part 824 move away from the first side 3b1. Furthermore, an inclination angle (fifth angle θ14) of the fourth part 824 with respect to the lower surface 5 may be larger than an inclination angle (fourth angle θ13) of the third part 823 with respect to the lower surface 5.

Specifically, as illustrated in FIG. 6, in a portion of the upper surface 3 positioned along the first side 3b1, the second convex portion 9, the third part 823 of the second portion 82 of the first convex portion 8, and the fourth part 824 of the second portion 82 of the first convex portion 8 may be positioned, in this order, from the cutting edge 2. In this case, the third angle θ1 of the first inclined surface 91 with respect to the reference plane S may be greater than the fourth angle θ13 of the third part 823 with respect to the reference plane S and the fifth angle θ14 of the fourth part 824 with respect to the reference plane S.

According to such a configuration, a portion of the first convex portion 8 along the first side 3b1 may be inclined upward, and thus, chips can be stably curled by the third part 823 and by the fourth part 824 even when the second convex portion 82 is worn down after being used for a long period of time. In addition, the inclination angle of the portion of the first convex portion 8 along the first side 3b1 may be smaller than the inclination angle of the portion corresponding to the corner 3a of the first convex portion 8. This enables a reduction in the likelihood that blockage with chips would occur due to an excessively large inclination angle.

Additionally, the fourth angle θ13 of the third part 823 may be smaller than the fifth angle θ14 of the fourth part 824. According to such a configuration, in high feed processing, with the third part 823 that has a relatively small inclination angle being provided on a side of the cutting edge 2, the fourth part 824 that has a relatively large inclination angle may be positioned at a large distance from the cutting edge 2. Thus, this may enable a reduction in the likelihood that resultant chips come into hard contact with the fourth part 824, which leads to blockage with the chips. In the present embodiments, for example, the fourth angle θ13 may range from 10° to 30°, and the fifth angle θ14 may range from 25° to 60°.

Furthermore, the upper end 9T of the second convex portion 9 may be positioned lower than a lower end 824D of the fourth part 824. In other words, the height of the upper end 9T of the second convex portion 9 may be lower than a height of the lower end 824D of the fourth part 824. According to such a configuration, the third part 823 having a relatively small inclination angle can increase the strength of the second convex portion 9 while reducing blockage with chips.

Furthermore, both the third part 823 and the fourth part 824 may be flat inclined surfaces. In such a case, chips can be made to flow smoothly when machining is performed on condition that a cutting amount of chips that are mainly curled by the third portion 83 is medium and the feed rate is medium.

On the other hand, the third part 823 and the fourth part 824 may be concave-curved surfaces that are smoothly connected to each other. In such a case, blockage with chips may be less likely to occur in machining to be performed with a small cutting amount and at a high feed rate.

Note that in an example illustrated in FIG. 6, the entire inner edge of the second convex portion 9 located at a large distance from the first side 3b1 may be connected to the third part 823, but the configuration of the inner edge of the second convex portion 9 is not limited to this. A part of the inner edge of the second convex portion 9 may be connected to the third 823, and the inner edge of the second convex portion 9 may be separated from the third part 823.

Additionally, the first convex portion 8 may have a flat end surface adjacent to the second portion 82. The first convex portion 8 may be positioned farthest away from the reference plane S on the upper surface 3. The flat end surface can be replaced with the upper end 8T of the first convex portion 8 described above.

Additionally, the first convex portion 8 may have a ridge line 8L defined by the upper end 8T and the second portion 82. A sixth angle θ21 between the ridge line 8L and the bisecting line L2 of the corner 3a may be larger than a seventh angle θ22 between the straight line L9 connecting the tip end portion 9F and the rear end portion 9R of the second convex portion 9 and the bisecting line L2 of the corner 3a in the top view.

According to such a configuration, the second convex portion 9 may be disposed closer to the cutting edge 2, and thus, favorable chip discharge performance can be exhibited in processing ranging from low-feed rate to high-feed rate processing operations. For example, the sixth angle θ21 may range from 10° to 40°, and the seventh angle θ22 may range from 30° to 60°.

Additionally, when a first imaginary line M1 is a straight line that passes through a boundary between the corner 3a and the first side 3b1 and that is perpendicular to the first side 3b1, the second convex portion 9 may be positioned across the first imaginary line M1.

According to such a configuration, regardless of whether the feed rate may be low or high, the second convex portion 9 can favorably contribute to chip processing, and thus, favorable chip discharge performance can be exhibited in processing ranging from low-feed rate to high-feed rate processing operations.

A portion of the second convex portion 9 positioned in a second region 32 may be larger than a portion of the second convex portion 9 positioned in a first region 31. According to such a configuration, the effect of curling the chips may become stable during high feed processing.

Furthermore, as illustrated in FIG. 6, the upper surface 3 may further have a third convex portion 14 in addition to the first convex portion 8 and the second convex portion 9. The second convex portion 9 may be positioned to correspond to the first side 3b1, and the third convex portion 14 may be positioned to correspond to the second side 3b2. Similar to the second convex portion 9, the third convex portion 14 may protrude in a direction away from the lower surface 5.

In the example illustrated in FIG. 6, the third convex portion 14 and the second convex portion 9 may be line-symmetric with respect to the bisecting line L2. Thus, in the present example, the third convex portion 14 may be substantially elliptical similar to the second convex portion 9, and the major axis direction of the third convex portion 14, which is elliptical, may be a direction along the second side 3b2.

According to such a configuration, the tip end portion of the first convex portion 8, which is positioned on the bisecting line L2, may be interposed between the second convex portion 9 and the third convex portion 14. Thus, the configuration may allow the insert 1, which is applicable to outer diameter machining, to be applicable to both end surface machining and outer diameter machining, as against a configuration not including the third convex portion 14.

Second Embodiment

Figure 15:
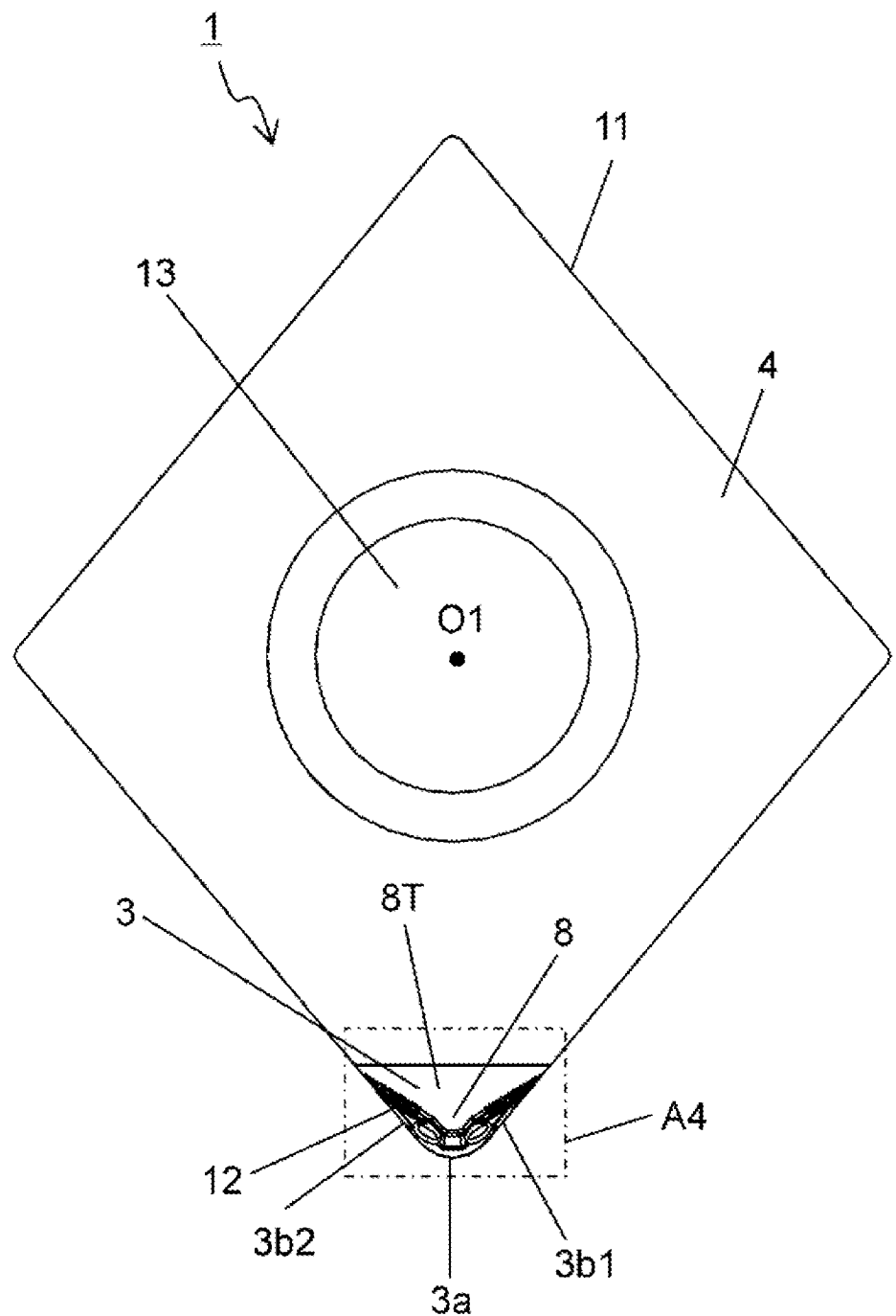
FIG. 15 is a top view illustrating a cutting insert according to a non-limiting embodiment of the present disclosure.
Figure 16:
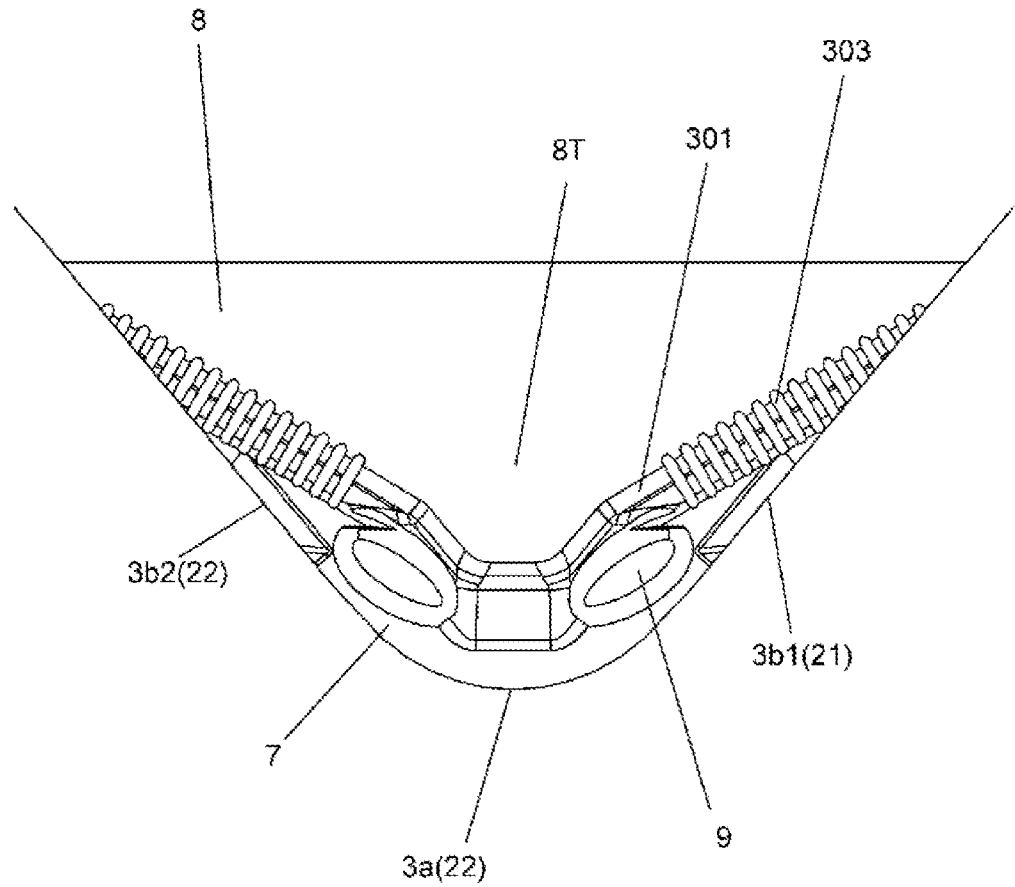
FIG. 16 is an enlarged view of a region A4 in FIG. 15.
Figure 17:
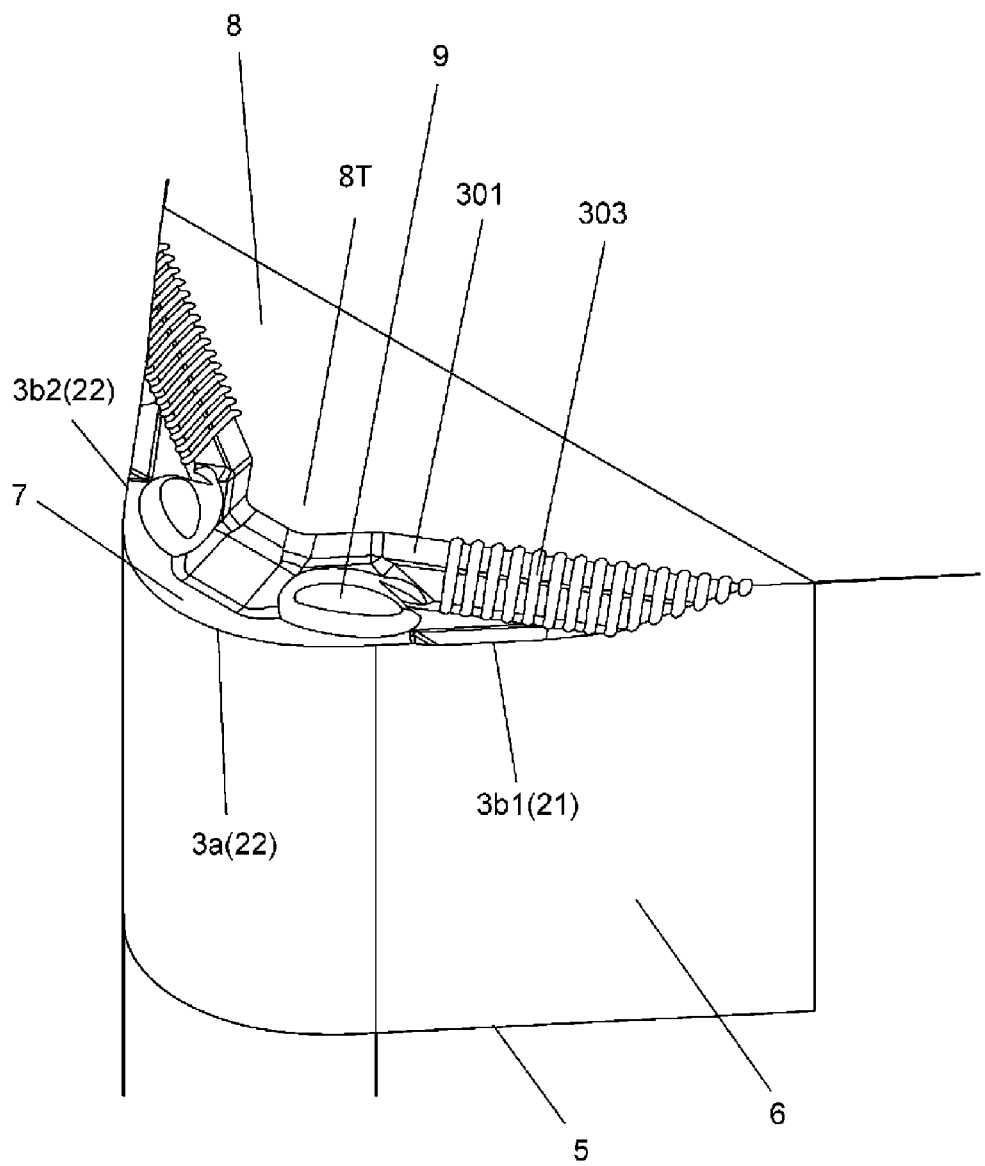
FIG. 17 is an enlarged perspective view of a neighborhood of a corner of the cutting insert illustrated in FIG. 15.

With reference to FIGS. 15 to 17, description will be given below of a cutting insert 1' (also referred to below simply as an insert 1') according to Second Embodiment of the present disclosure. Note that components same as the components of the insert according to First Embodiment described above may be omitted.

The insert 1', similar to the insert 1 of First Embodiment, may have the main body 11 and the sintered body portion 12. The sintered body portion 12 may have the upper surface 3 including the first side 3b1, the second side 3b2, and the corner 3a, and the side surface 6 adjacent to the upper surface 3. The sintered body portion 12 may have the lower surface 5 opposite the upper surface. Additionally, the upper surface 3 may have the first convex portion 8 and the second convex portion 9.

In examples illustrated in FIGS. 16 and 17, the first convex portion 8 may have a flat end surface that is orthogonal to the central axis O1 of the main body 11 and that is positioned farthest away from the reference plane S positioned below the upper surface 3. The flat end surface can be replaced with the upper end 8T of the first convex portion described in First Embodiment.

In the examples illustrated in FIGS. 16 and 17, the upper surface 3 may have the edge portion 7 located along the first side 3b1, the second side 3b2, and the corner 3a and extending in a direction away from the first side 3b1, the second side 3b2, and the corner 3a. In the examples illustrated in FIGS. 16 and 17, the upper surface 3 may have a second inclined surface 301 positioned between the upper end 8T and the edge portion 7 and inclined with respect to the upper end 8T.

In an example illustrated in FIG. 16, the second inclined surface 301 may have grooves 303 each extending in a direction inclined with respect to the first side 3b1 in the top view. For example, in processing using a coolant (cooling fluid), the configuration described above may allow the coolant to flow more easily into the first cutting edge 21. This is because the grooves 303 positioned in the second inclined surface 301 may be positioned to incline with respect to the first side 3b1, and thus, when the coolant flows into the grooves 303, the coolant may easily flow into the first cutting edge 21 positioned on the first side 3b1.

Note that the grooves 303 being inclined with respect to the first side 3b1 may mean that the grooves 303 are not at least parallel to the first side 3b1. Additionally, the inclination angle of the grooves 303 with respect to the first side 3b1 can be set to range from 20° to 90°. In addition, the inclination angle of the grooves 303 with respect to the first side 3b1 can be set to range from 40° to 80° in accordance with the type of coolant. Additionally, in a case where at least two of the grooves 303 extend parallel to each other, the flow direction of the chips may be more easily controlled.

Additionally, in the examples illustrated in FIGS. 16 and 17, at least one of the grooves 303 may be connected to the first side 3b1. With the configuration described above, the first cutting edge 21 may have high durability. Since at least one of the grooves 303 is connected to the first cutting edge 21 positioned on the first side 3b1, an area in which the first cutting edge 21 contacts the chips may be small. Thus, cutting resistance exerted on the first cutting edge 21 may be reduced, and this may lead to improved durability of the first cutting edge 21.

In the examples illustrated in FIGS. 16 and 17, approximately half of the grooves 303 located at a large distance from the corner 3a may be connected to the first side 3b1.

In the examples illustrated in FIGS. 16 and 17, at least one of the grooves 303 may extend to the upper end 8T. For example, in processing that uses a coolant, the configuration described above may allow the coolant to flow more easily into the first cutting edge 21. This is because even the coolant sprayed on the upper end 8T can be caused to flow to the first cutting edge 21 through the grooves 303.

Note that the extension to the upper end 8T may also have an aspect in which an end portion of at least one of the grooves 303 that is located farthest from the first side 3b1 contacts a ridge line defined by the upper end 8T and the second inclined surface 301. In processing using a coolant, such a configuration also may allow the coolant to flow more easily into the first cutting edge 21.

The insert 1 according to multiple embodiments of the present disclosure has been described above. However, the insert of the present disclosure is not limited to these embodiments.

For example, the components of each of the first portion 81, the second portion 82, and the third portion 83 of the first convex portion 8 may or may not be directly connected together. For example, in the third portion 83 of the first convex portion 8, the first part 831 and the second part 832 may be connected together, or surfaces of different fillets or the like may be formed between the first part 831 and the second part 832.

Cutting Tool

Now, description will be given of the cutting tool 101 according to non-limiting embodiments of the present disclosure with reference to the drawings.

Figure 18:
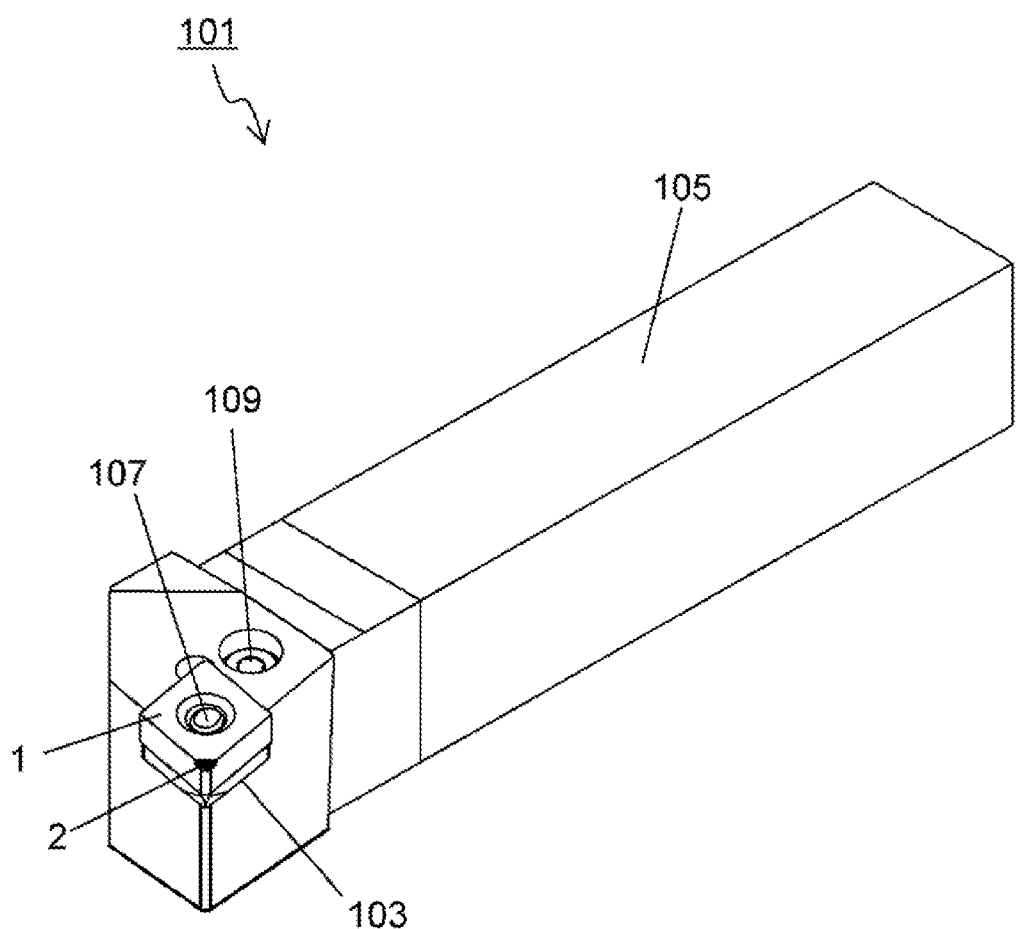
FIG. 18 is a perspective view illustrating a cutting tool according to a non-limiting embodiment of the present disclosure.

As illustrated in FIG. 18, the cutting tool 101 of the embodiments may have a holder 105 including an insert pocket 103 (hereinafter also referred to simply as a pocket 103) on a tip end side of the cutting tool 101, and the insert 1 attached into the pocket 103. In this case, the insert 1 may be attached into the pocket 103 such that at least the cutting edge 2 projects from the tip end of the holder 105, in other words, such that the cutting edge 2 projects outward from the holder 105.

The holder 105 of the embodiments may be shaped like an elongated rod extending from the tip end toward a rear end. One pocket as the pocket 103 may be provided at the tip end side of the holder 105 in an example illustrated in FIG. 18. The pocket 103 may be a portion into which the insert 1 is attached, and may open at a tip end surface of the holder 105.

The insert 1 may be secured to an insert pocket, for example, by a clamp member 107. That is, with a tip end portion of the clamp member 107 inserted into a through-hole of the insert 1, a fixing screw 109 may be inserted into the through-hole of the clamp member 107. Then, a tip end of the bolt 105 may be inserted into a screw hole (not illustrated) formed in the holder 103 to engage the screw portions with each other, and the tip end portion of the clamp portion 107 may press the insert 1 against the holder 103. Thus, the insert 1 may be attached into the holder 105.

Note that a method of securing the insert 1 to the pocket 103 is not limited to a method using such a clamping structure. For example, any other method may be employed, such as screw-locking that does not use the clamp member 107.

As a material for the holder 105, the clamp member 107, and the fixing screw 109, for example, steel or cast iron can be used. Among these materials, steel may have high toughness.

Method of Manufacturing Machined Product

Next, a description will be given of a method of manufacturing a machined product according to embodiments of the present disclosure with reference to the drawings.

A machined product may be manufactured by machining a workpiece 201. In the embodiments, outer diameter machining may be given as an example of the machining. Other examples of the machining than the outer diameter machining may have boring, grooving, and end surface machining. The method of manufacturing a machined product in the embodiments may have the following steps (1) to (3):

(1) rotating the workpiece 201;
(2) bringing at least the cutting edge of the cutting tool 101, which is typified by the embodiments described above, into contact with the workpiece 201 that is rotating; and
(3) separating the cutting tool 101 from the workpiece 201.

Figure 19:
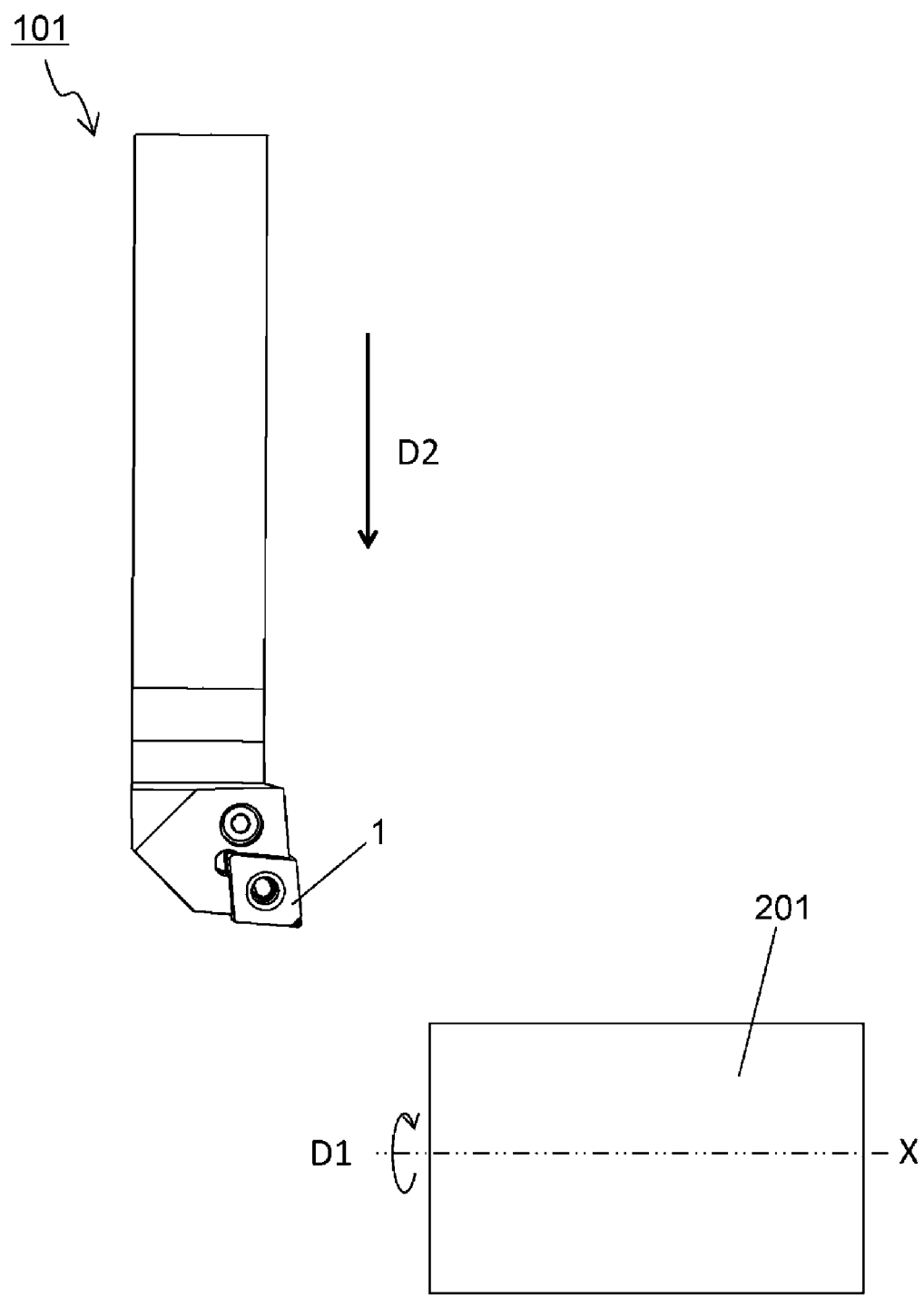
FIG. 19 is a schematic diagram illustrating one step in a method of manufacturing a machined product according to a non-limiting embodiment of the present disclosure.
Figure 20:
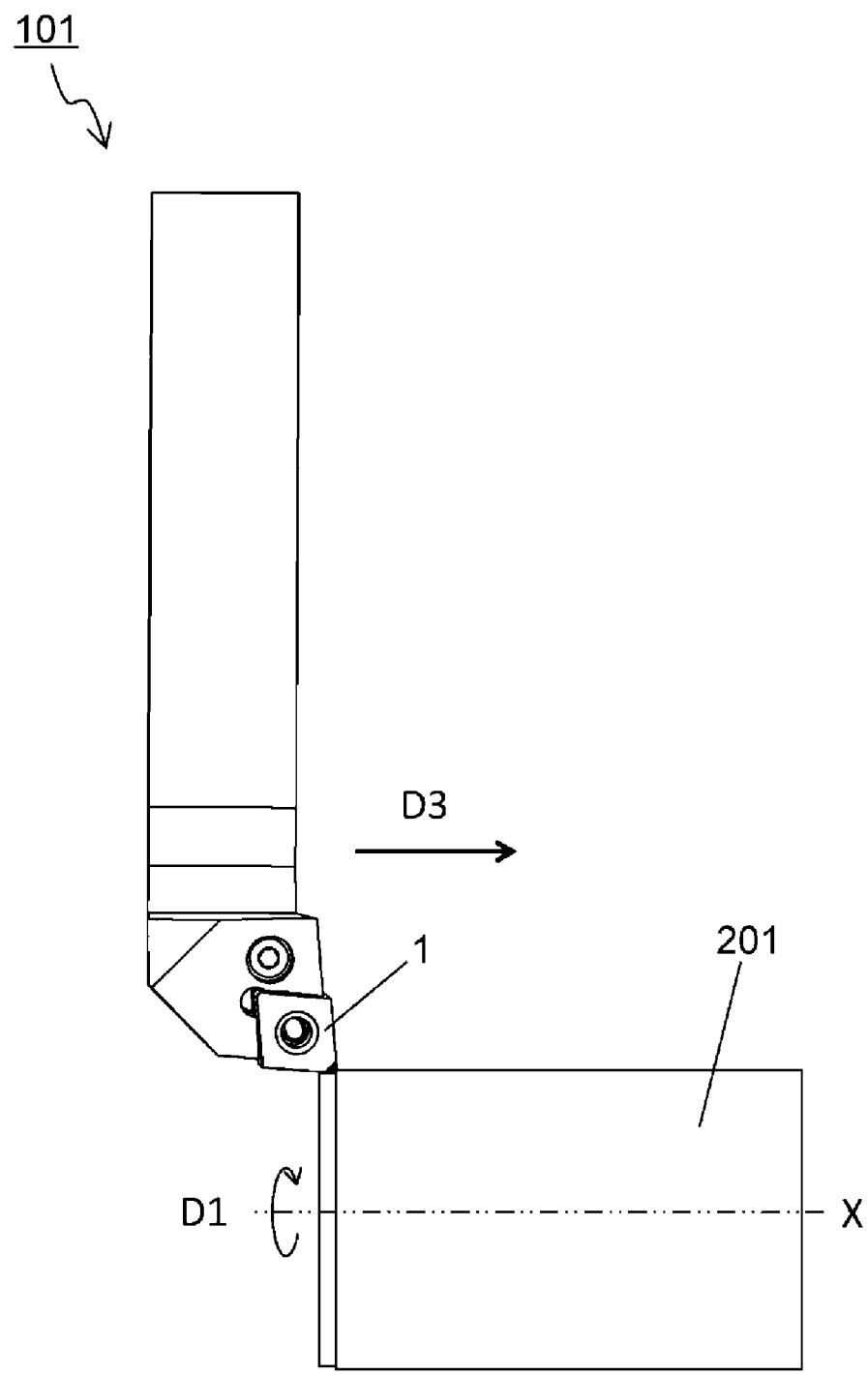
FIG. 20 is a schematic diagram illustrating one step in the method of manufacturing a machined product according to a non-limiting embodiment of the present disclosure.

More specifically, first, as illustrated in FIG. 19, the workpiece 201 may be rotated in a D1 direction about an axis X. The cutting tool 101 may be brought relatively close to the workpiece 201 by moving the cutting tool 101 in a D2 direction. Then, as illustrated in FIG. 20, the cutting edge of the cutting tool 101 may be brought into contact with the workpiece 201 to cut the workpiece 201. At this time, the workpiece 201 may be cut, with the cutting tool 101 being moved in a D3 direction, whereby the surface of the workpiece is machined. Then, as illustrated in FIG. 21, the cutting tool 101 may be relatively moved away from the work material 201 by moving the cutting tool 101 in a D4 direction.

In the example illustrated in FIG. 19 the cutting tool 101 may be brought close to the workpiece 201, with the axis D being fixed and the workpiece 201 being rotated. Additionally, in FIG. 20, the workpiece 201 may be cut by bringing the cutting edge of the insert 1 into contact with the workpiece 201 that is rotating. Additionally, in FIG. 21 the cutting tool 101 may be moved away from the workpiece 201 that is rotating.

Figure 21:
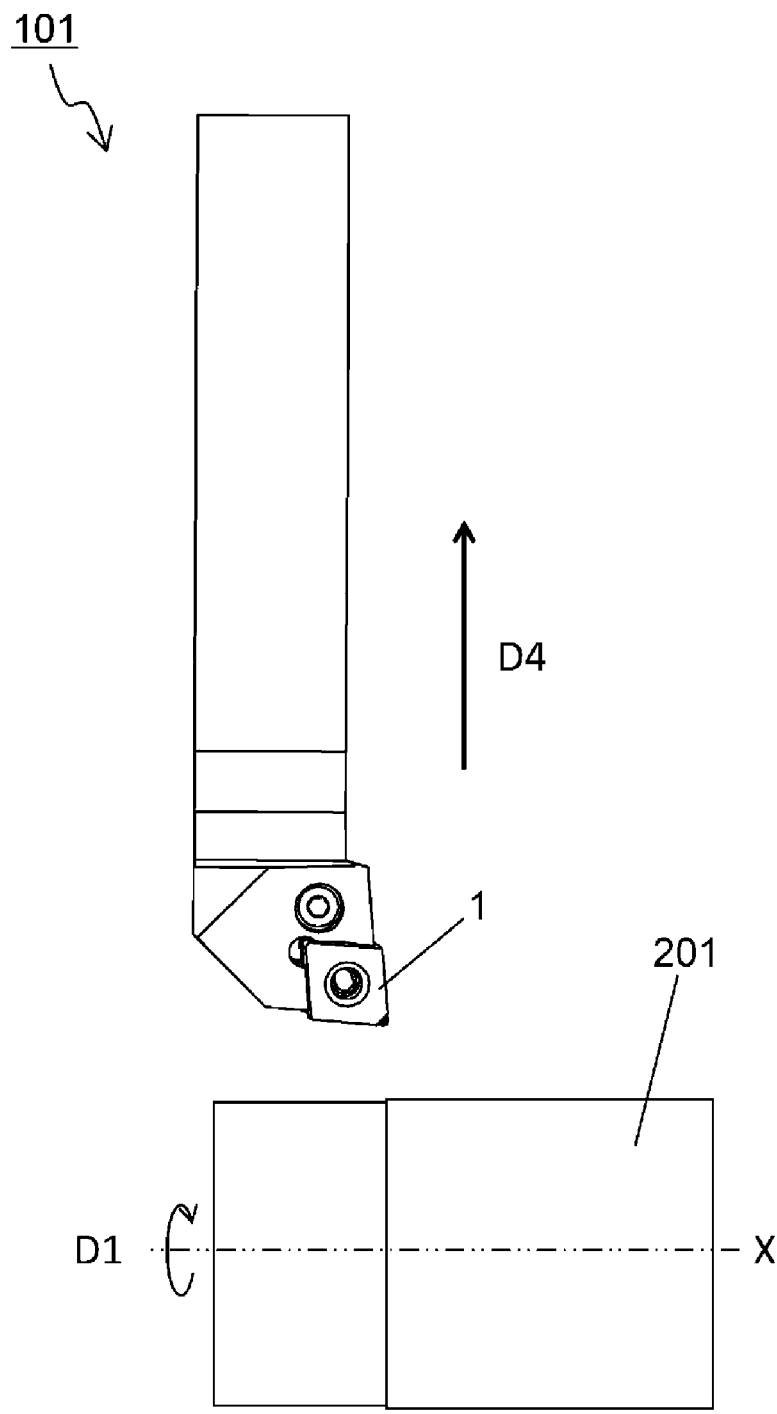
FIG. 21 is a schematic diagram illustrating one step in the method of manufacturing a machined product according to a non-limiting embodiment of the present disclosure.

Note that, in the machining in the manufacturing method in the example illustrated in FIGS. 19 to 21, in each of the steps, the cutting tool 101 may be brought into contact with the workpiece 201 or the cutting tool 101 may be separated from the workpiece 201 by moving the cutting tool 101, but that the embodiments are, of course, not limited to such an aspect.

For example, in step (1), the work piece 201 may be brought close to the cutting tool 101. In the same manner, in step (3), the work piece 201 may be moved away from the cutting tool 101. In a case where the machining is continued, the step of bringing the cutting edge of the insert 1 into contact with a different portion of the workpiece 201 may be repeated, with the workpiece 201 kept rotating.

Note that examples of the material of the workpiece 201 include carbon steel, alloy steel, stainless steel, cast iron, and non-ferrous metal.

The embodiments according to the present disclosure are described above. However, the present disclosure is not limited to the aforementioned embodiments, and may naturally have various modifications within a scope that does not deviate from the spirit of the present disclosure.

REFERENCE SIGNS LIST 1, 1' Cutting insert (insert)
2 Cutting edge
21 First cutting edge
22 Second cutting edge
11 First member (main body)
4 Main surface of main body
12 Second member (sintered body portion)
3 Upper surface
3b1 First side
3b2 Second side
3a Corner
31 First region
32 Second region
33 Third region
5 Lower surface
6 Side surface
7 Edge portion
8 First convex portion
81 First portion
82 Second portion
823 Third part
824 Fourth part
83 Third portion (first ridge portion)
831 First part
832 Second part
9 Second convex portion
9F First end portion (tip end portion)
9R Second end portion (rear end portion)
91 First inclined surface
13 Through-hole
101 Cutting tool
103 Insert pocket (pocket)
105 Holder
107 Clamp member
109 Fixing screw
201 Workpiece
W21 First length
W22 Second length
W4 Length from lower end 83D of first ridge portion 83 to corner 3a
W5 Length from tip end portion 9F of second convex portion 9 to corner 3a
θ1 Third angle
θθ11 First angle
θθ12 Second angle
θ21 Sixth angle
θ22 Seventh angle
θ13 Fourth angle
θ14 Fifth angle
L1 Tangent of corner 3a passing from lower end 83D of first ridge portion 83 through center point of corner 3a
L2 Bisecting line of corner 3a
L9 Straight line connecting tip end portion 9F and rear end portion 9R of second convex portion 9 (straight line indicating extending-direction of second convex portion 9)

The invention claimed is:
1. A cutting insert comprising:
a first member; and a second member joined to the first member, wherein
the second member comprising
- an upper surface including a first side, a second side, and a corner positioned between the first side and the second side, and
- a side surface adjacent to the upper surface, the upper surface comprising
- a first convex portion extending toward the corner, and
- a second convex portion extending from the first convex portion toward the first side, the first convex portion comprises:
- a first portion facing to the corner;
- a second portion facing to the first side; and
- a third portion positioned between the first portion and the second portion, the second convex portion comprising
- a first end portion, and
- a second end portion located closer to the corner than the first end portion, a first length from the first end portion to the first side is less than a second length from the second end portion to the first side in a top view, a first straight line is an imaginary straight line that passes through a center point of the corner and is orthogonal to a bisecting line of the corner, and a third length from the first straight line to the third portion is less than a fourth length from the first straight line to the second end portion in the top view.

2. The cutting insert according to claim 1, wherein the second convex portion comes close to the first side as the second convex portion moves away from the corner in the top view.

3. The cutting insert according to claim 1, wherein second convex portion is positioned lower than an upper end of the first convex portion.

4. The cutting insert according to claim 1, wherein the second convex portion is positioned lower than an upper end of the third portion.

5. The cutting insert according to claim 1, wherein
the first portion has a flat shape, and
the third portion faces to the corner and has a convex curved shape in the top view.

6. The cutting insert according to claim 1, wherein
the third portion is inclined upward as the third portion moves away from the corner, and comprises:
- a first part; and
- a second part located farther from the corner than the first part, the second convex portion comprises a first inclined surface inclined upward as the second convex portion moves away from the first side, the second member further comprises a lower surface positioned opposite to the upper surface, the first convex portion further comprises an end surface having a flat shape and positioned furthest from the lower surface, a reference plane is parallel to the end surface and is located between the upper surface and the lower surface, a first angle of the first part with respect to the reference plane and a second angle of the second part with respect to the reference plane are smaller than a third angle of the first inclined surface with respect to the reference plane.

7. The cutting insert according to claim 6, wherein the first angle is smaller than the second angle.

8. The cutting insert according to claim 6, wherein the second convex portion is positioned lower than a lower end of the second part.

9. The cutting insert according to claim 6, wherein the first part and the second part are both convex curved surfaces.

10. The cutting insert according to claim 6,
wherein the second portion is inclined upward as the second portion moves away from the first side, and comprises:
- a third part; and
- a fourth part located farther from the first side than the third part, and the third angle is larger than a fourth angle of the third part with respect to the reference plane and a fifth angle of the fourth part with respect to the reference plane.

11. The cutting insert according to claim 10, wherein the fourth angle is smaller than the fifth angle.

12. The cutting insert according to claim 10, wherein the second convex portion is positioned lower than a lower end of the fourth part.

13. The cutting insert according to claim 1, wherein
the second member further comprises a lower surface positioned opposite to the upper surface,
the first convex portion comprises:
- an end surface having a flat surface and positioned adjacent to the second portion and furthest away from the lower surface; and
- a ridge line defined by the end surface and the second portion, and a sixth angle between the ridge line and the bisecting line of the corner is larger than a seventh angle between a line connecting the first end portion and the second end portion of the second convex portion and the bisecting line of the corner in the top view.

14. The cutting insert according to claim 1, wherein,
a first imaginary line is a straight line that passes through a boundary between the corner and the first side and that is perpendicular to the first side in the top view, and
the second convex portion is positioned across the first imaginary line in the top view.

15. A cutting tool comprising:
the cutting insert according to claim 1; and
a holder into which the cutting insert is attached.

16. A cutting insert comprising:
a first member; and
a second member joined to the first member, wherein
the second member comprising
- an upper surface including a first side, a second side, and a corner positioned between the first side and the second side, and
- a side surface adjacent to the upper surface, the upper surface comprising
- a first convex portion extending toward the corner, and
- a second convex portion extending from the first convex portion toward the first side, the second convex portion comprising
- a first end portion, and
- a second end portion located closer to the corner than the first end portion, a first length from the first end portion to the first side is less than a second length from the second end portion to the first side in a top view, the second member further comprises a lower surface positioned opposite to the upper surface, the first convex portion comprises an end surface having a flat surface and positioned furthest from the lower surface the upper surface further comprises:
an edge located along the first side, the second side and the corner and
a second inclined surface positioned between the end surface and the edge and inclined with respect to the end surface, and
the second inclined surface comprises grooves each extending in a direction inclined with respect to the first side in the top view.

17. The cutting insert according to claim 16, wherein at least one of the grooves is connected to the first side.

18. The cutting insert according to claim 16, wherein at least one of the grooves extends to the end surface.

* * * * *